United States Patent
Ueda et al.

(10) Patent No.: US 7,274,579 B2
(45) Date of Patent: Sep. 25, 2007

(54) CONVERTER CIRCUIT AND MOTOR DRIVING APPARATUS

(75) Inventors: Mitsuo Ueda, Nishinomiya (JP); Hideki Nakata, Katano (JP); Masanori Ogawa, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 172 days.

(21) Appl. No.: 10/936,704

(22) Filed: Sep. 9, 2004

(65) Prior Publication Data

US 2005/0057210 A1    Mar. 17, 2005

(30) Foreign Application Priority Data

Sep. 9, 2003   (JP) ............... 2003-316862

(51) Int. Cl.
*H02M 7/02*   (2006.01)
*H02M 5/40*   (2006.01)

(52) U.S. Cl. .................... 363/125; 363/35; 363/36; 363/37; 363/89

(58) Field of Classification Search .............. 363/34, 363/35, 37, 44, 52, 53, 59–61, 67–70, 84, 363/86, 89, 125–127
See application file for complete search history.

(56) References Cited

U.S. PATENT DOCUMENTS

| 5,383,109 A * | 1/1995 | Maksimovic et al. ....... 323/222 |
| 5,502,630 A * | 3/1996 | Rokhvarg .................... 363/84 |
| 5,572,415 A * | 11/1996 | Mohan ........................ 363/61 |
| 5,654,591 A * | 8/1997 | Mabboux et al. ............ 307/66 |
| 6,181,583 B1 * | 1/2001 | Okui et al. .................. 363/45 |
| 6,437,998 B1 * | 8/2002 | Mino et al. .................. 363/37 |

FOREIGN PATENT DOCUMENTS

| JP | 2001-211651 | 8/2001 |
| JP | 3308993 | 5/2002 |

* cited by examiner

*Primary Examiner*—Gary L Laxton
(74) *Attorney, Agent, or Firm*—Wenderoth, Lind & Ponack, L.L.P.

(57) ABSTRACT

A converter circuit for converting an output voltage from an AC power supply includes a rectifier circuit for rectifying the output voltage of the AC power supply; first and second capacitors connected in series, for smoothing the output of the rectifier circuit; and a switch circuit for switching the connections between the respective capacitors and the AC power supply so that the output voltage of the AC power supply is applied to each of the respective capacitors at a cycle that is shorter than the cycle of the AC power supply.

4 Claims, 11 Drawing Sheets

CONVERTER CIRCUIT AND MOTOR DRIVING APPARATUS

FIELD OF THE INVENTION

The present invention relates to a converter circuit and a motor driving apparatus and, more particularly, to a converter circuit which is capable of boosting an input voltage, and a motor driving apparatus using the converter circuit.

BACKGROUND OF THE INVENTION

Conventionally, a full-wave voltage doubler circuit has been employed to boost an input voltage from 100V to 200V.

FIG. 16 is a diagram illustrating an example of a conventional full-wave voltage doubler circuit.

The full-wave voltage doubler circuit 10 comprises a bridge diode circuit 4 for rectifying an output voltage of an AC power supply 1, a power-factor improvement reactor 3 which is connected in series between the AC power supply 1 and the bridge diode circuit 4, two electrolytic capacitors 5 and 6 which are connected in series to each other and in parallel to the bridge diode circuit 4, and an electrolytic capacitor 9 which is connected in parallel to the electrolytic capacitors 5 and 6.

With reference to FIG. 16, input terminals 1a and 1b of the full-wave voltage doubler circuit are connected to an output terminal of the AC power supply 1. The bridge diode circuit 4 comprises two diodes 4a and 4b which are connected in series between output terminals 1c and 1d of the full-wave voltage doubler circuit 10, and a connection node 4c of the diodes 4a and 4b is connected to the input terminal 1a of the full-wave voltage doubler circuit 10 through the power-factor improvement reactor 3. Further, the other input terminal 1b of the full-wave voltage doubler circuit 10 is connected to a connection node of the electrolytic capacitors 5 and 6, and protection diodes 7 and 8 are connected in parallel to the electrolytic capacitors 5 and 6, respectively.

In the full-wave voltage doubler circuit 10 thus constituted, the output voltage of the AC power supply 1 is full-wave-rectified by the diodes 4a and 4b which are components of the bridge diode circuit 4, and the electrolytic capacitors 5 and 6 are alternately charged by a full-wave-rectified output from the bridge diode circuit 4 at a cycle equal to the cycle of the output voltage of the AC power supply 1. A voltage twice as high as the output voltage of the AC power supply 1, which is caused by this charging at both ends of the capacitors 5 and 6 connected in series, is smoothed by the electrolytic capacitor 9, and a smoothed double-high voltage is generated between the output terminals 1c and 1d of the full-wave voltage doubler circuit 10.

On the other hand, there has also been proposed another example of a full-wave voltage doubler circuit wherein, in order to increase efficiency, a metallized film capacitor is used as a voltage doubler capacitor to be charged by a rectified output of diodes connected in series, and two bridge diode circuits are connected in parallel (for example, refer to Japanese Published Patent Application No. 2001-211651 (FIG. 1)).

Further, there has also been proposed a circuit system wherein a rectifier circuit is provided with a booster circuit, in order to increase the power factor of an input power supply and boost the input voltage to an arbitrary voltage (for example, refer to Japanese Patent No. 3308993 (FIG. 1)).

FIG. 17 is a diagram for explaining a voltage conversion circuit disclosed in Japanese Patent No. 3308993.

The voltage conversion circuit 11 comprises a rectifier circuit 20 for rectifying an output voltage of an AC power supply 1 which is applied to input terminals 2a and 2b, a booster circuit 13 for boosting an output voltage of the rectifier circuit 20, and an electrolytic capacitor 17 which is charged by an output voltage of the booster circuit 13.

The rectifier circuit 20 comprises first and second diodes 21 and 22 which are connected in series, and third and fourth diodes 23 and 24 which are connected in series. A connection node 20a of the first and second diodes 21 and 22 is connected to an input terminal 2a of the voltage conversion circuit 11, and a connection node 20b of the third and fourth diodes 23 and 24 is connected to the other input terminal 2b of the voltage conversion circuit 11. Further, the cathodes of the first and third diodes 21 and 23 are connected to each other, and the connection node of the first and third diodes 21 and 23 is an output terminal of the rectifier circuit 20. The anodes of the second and fourth diodes 22 and 24 are connected to each other, and the connection node of the second and fourth diodes 22 and 24 is the other output terminal of the rectifier circuit 20.

The booster circuit 13 comprises a reactor 14 having an end connected to the other end of the rectifier circuit 20, a diode 16a having an anode connected to the other end of the reactor 14 and a cathode connected to the output terminal 2c of the voltage conversion circuit 11, and a switching element 15 which is connected between the connection node of the reactor 14 and the diode 16a and the other output terminal of the rectifier circuit 20. The switching element 15 is an IGBT (Insulated Gate type Bipolar Transistor), and a diode 16b is connected in inverse-parallel to the IGBT 15.

In the voltage conversion circuit 11, the AC voltage supplied from the AC power supply 1 is rectified by the rectifier circuit 20, and the output of the rectifier circuit 20 is input to the booster circuit 13. In the booster circuit 13, the output of the rectifier circuit 20 is boosted by on-off of the switching element 15. That is, an electric path at the output side of the reactor 14 is short-circuited when the switching element 15 is turned on, whereby a DC current flows from the rectifier circuit 20 into the reactor 14, and energy is stored in the reactor 14. Thereafter, when the switching element 15 is turned off, an induced voltage is generated in the reactor 14, and the capacitor 17 is charged by a sum voltage of the induced voltage and the output voltage of the rectifier circuit 20, whereby a voltage higher than the output voltage of the rectifier circuit 20 is generated between the terminals of the capacitor 17.

In the voltage conversion circuit 11 having the booster circuit 13 of this type, the current supplied from the AC power supply 1 is controlled so as to have a sinusoidal waveform by adjusting the time ratio between the on period and the off period of the switching element 15, whereby the power factor is improved. Further, the magnitude (absolute value) of the input current is controlled by adjusting the time ratio, whereby the level of the output DC voltage can be controlled.

However, the conventional full-wave voltage doubler circuit 10 shown in FIG. 16 requires the large-capacitance voltage-doubler capacitors 5 and 6 and the reactor 3 for improving the power factor. Further, if the capacitance of the voltage-doubler capacitor is small, the capacitor does not operate as a voltage-doubler capacitor.

In brief, the operation of the voltage-doubler circuit is as follows. That is, the two capacitors connected in series are alternately charged at every half period of the input AC voltage, and a sum voltage of the terminal voltages of the two capacitors is outputted. Therefore, when the capacitances of the capacitors are small, the terminal voltages of the charged capacitors are undesirably lowered during the half period of the input voltage when no charging is carried out, and the output voltage of the voltage-doubler circuit 10, which is output as a sum voltage of the terminal voltages of the two capacitors, is not double the input voltage.

On the other hand, the conventional voltage conversion circuit 11 shown in FIG. 17 is a component of, for example, a motor driving apparatus, and the capacitance of the reactor 14 as a component of the booster circuit 13 and the capacitance of the capacitor 17 charged by the output of the booster circuit 13 are determined according to the switching frequency of the switching element 15. That is, in order to reduce the capacitance of the reactor 14, the switching frequency must be increased so as to reduce the harmonic current that appears at the input end. Further, since the ripple of the voltage charged in the capacitor 17 is increased as the capacitance of the capacitor 17 is reduced, the switching frequency must be increased to reduce the ripple.

However, considering the efficiency of the voltage conversion circuit 11 or the cost of the harmonic switching element, there is a limitation in actually increasing the switching frequency by the booster circuit 13, and therefore, the capacitances of the reactor 14 and the capacitor 17 cannot be reduced by a predetermined value or more.

As described above, in the circuit structures such as the conventional full-wave voltage doubler circuit 10 and the voltage conversion circuit 11, since the capacitances of the capacitors and the reactors, which are components of these circuits, cannot be reduced by a predetermined value or more, the circuit scale of the full-wave voltage doubler circuit 10 or the voltage conversion circuit 11 cannot be reduced. Therefore, it is difficult to reduce the size of a motor driving apparatus including these circuits.

SUMMARY OF THE INVENTION

The present invention is made to solve the above-described problems and has for its object to provide a small-footprint converter circuit capable of generating a voltage that is double an input voltage, without using large-capacitance capacitors and reactors.

It is another object of the present invention to provide a compact motor driving apparatus employing the converter circuit.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a converter circuit having a pair of input terminals and a pair of output terminals, and boosting an AC voltage. The converter circuit comprises: a rectifier circuit for rectifying an output voltage of an AC power supply, which is input to the input terminals, and outputting the rectified voltage to the output terminals; plural capacitors connected in series between the two output terminals; and a switch circuit for switching the connections between the respective capacitors and the AC power supply so that the output voltage of the AC power supply is applied to each of the respective capacitors at a cycle that is shorter than the cycle of the AC power supply. Therefore, it is possible to significantly reduce the capacitances of the respective capacitors in the converter circuit which are required for generating a voltage that is twice as high as the input voltage in this converter circuit. Further, the reduction in the capacitances of the capacitors which are components of the converter circuit leads to a reduction in the capacitance of a reactor which is used for improving the power factor of the converter circuit. As a result, the capacitors and the reactor, which occupy a greater part of the volume of the converter circuit, can be reduced in size, whereby the volume of the converter circuit itself can be significantly reduced.

According to a second aspect of the present invention, in the converter circuit according to the first aspect, the plural capacitors are first and second capacitors connected in series. In addition, the switch circuit comprises first and second switching elements connected in series, first and second diodes connected in series and connected in parallel to the switching elements connected in series, and third and fourth diodes connected in series and connected in parallel to the switching elements connected in series. Furthermore, a connection node of the first and second diodes is connected to one of the input terminals, a connection node of the third and fourth diodes is connected to the other input terminal, and a connection node of both the switching elements is connected to a connection node of the both capacitors. Therefore, it is possible to avoid high-speed switching operations of the respective switching elements, whereby an increase in a harmonic current in the converter circuit can be minimized. Further, since no high-speed switching elements are required, the converter circuit is realized at a reduced cost.

According to a third aspect of the present invention, in the converter circuit according to the first aspect, the switch circuit includes a first bidirectional switch connected between one of the input terminals and a connection node of both the capacitors, and a second bidirectional switch connected between the other input terminal and the connection node of both the capacitors. Therefore, it is possible to reduce the number of components of the converter circuit, in addition to the effect of reducing the capacitances of the capacitors which are required for generating a voltage twice as high as the input voltage.

According to a fourth aspect of the present invention, there is provided a converter circuit having a pair of input terminals and a pair of output terminals, and boosting an AC voltage. The converter circuit comprises: a rectifier circuit for rectifying an output voltage of an AC power supply, which is applied to the input terminals, and outputting the rectified voltage to the output terminals; a first capacitor connected between the output terminals; a second capacitor having an end connected to one of the output terminals; and a switch circuit for switching the connections between the other end of the second capacitor and the one and the other input terminals so that the output voltage of the AC power supply is applied to the second capacitor, while a sum voltage of the terminal voltage of the second capacitor and the output voltage of the AC power supply is applied to the first capacitor, at a cycle that is shorter than the cycle of the AC power supply. Therefore, it is possible to significantly reduce the capacitances of the respective capacitors which are required for generating a voltage that is twice as high as the input voltage in this converter circuit. Further, the reduction in the capacitances of the capacitors which are components of the converter circuit leads to a reduction in the capacitance of a reactor which is used for improving the power factor of the converter circuit. As a result, it is possible to realize a compact converter circuit in which the capacitors and the reactor, which occupy a greater part of the volume of the converter circuit, are reduced in size.

According to a fifth aspect of the present invention, in the converter circuit according to the fourth aspect, the switch circuit includes first and second switching elements connected in series, first and second diodes connected in series and connected in parallel to the switching elements connected in series, and third and fourth diodes connected in series and connected in parallel to the switching elements connected in series. In addition, a connection node of the first and second diodes is connected to one of the input terminals, a connection node of the third and fourth diodes is connected to the other input terminal, and a connection node of both the switching elements is connected to the other end of the second capacitor. Therefore, it is possible to avoid high-speed switching operations of the respective switching elements, whereby an increase in a harmonic current in the converter circuit can be minimized. Further, since no high-speed switching elements are required, the converter circuit is realized at a reduced cost.

According to a sixth aspect of the present invention, in the converter circuit according to the fourth aspect, the switch circuit includes a first bidirectional switch connected between one of the input terminals and the other end of the second capacitor, and a second bidirectional switch connected between the other input terminal and the other end of the second capacitor. Therefore, it is possible to reduce the number of components of the converter circuit, in addition to the effect of reducing the capacitances of the capacitors required for generating a voltage twice as high as the input voltage.

According to a seventh aspect of the present invention, there is provided a motor driving apparatus receiving an output voltage of an AC power supply, converting the output voltage of the AC power supply into a driving voltage, and outputting the driving voltage to a motor. The motor driving apparatus comprises: a converter circuit having a pair of input terminals and a pair of output terminals, and boosting the output voltage of the AC power supply; and an inverter circuit for converting an output voltage of the converter circuit into a three-phase AC voltage, and outputting the three-phase AC voltage as a driving voltage to the motor. The converter circuit comprises a rectifier circuit for rectifying the output voltage of the AC power supply, which is applied to the input terminals, and outputting the rectified voltage to the output terminals, plural capacitors connected in series between the output terminals, and a switch circuit for switching the connections between the respective capacitors and the AC power supply so that the output voltage of the AC power supply is applied to each of the plural capacitors at a cycle that is shorter than the cycle of the AC power supply. Therefore, it is possible to significantly reduce the capacitances of the respective capacitors which are required for generating a voltage that is twice as high as the input voltage in this converter circuit. Further, the reduction in the capacitances of the capacitors in the converter circuit leads to a reduction in the capacitance of a reactor which is used for improving the power factor of the converter circuit. As a result, it is possible to realize a compact converter circuit in which the capacitors and the reactor, which occupy a greater part of the volume of the converter circuit, are reduced in size, leading to a reduction in size of the motor driving apparatus.

According to an eighth aspect of the present invention, in the motor driving apparatus according to the seventh aspect, the plural capacitors are first and second capacitors connected in series. In addition, the switch circuit comprises first and second switching elements connected in series, first and second diodes connected in series and connected in parallel to the switching elements connected in series, and third and fourth diodes connected in series and connected in parallel to the switching elements connected in series. Furthermore, a connection node of the first and second diodes is connected to one of the input terminals, a connection node of the third and fourth diodes is connected to the other input terminal, and a connection node of both the switching elements is connected to a connection node of the both capacitors. Therefore, it is possible to avoid high-speed switching operations of the respective switching elements, whereby an increase in a harmonic current in the converter circuit can be minimized. Further, since no high-speed switching elements are required, the converter circuit is realized at reduced cost.

According to a ninth aspect of the present invention, there is provided a motor driving apparatus receiving an output voltage of an AC power supply, converting the output voltage of the AC power supply into a driving voltage, and outputting the driving voltage to a motor. The motor driving apparatus comprises: a converter circuit having a pair of input terminals and a pair of output terminals, and boosting the output voltage of the AC power supply; and an inverter circuit for converting an output voltage of the converter circuit into a three-phase AC voltage, and outputting the three-phase AC voltage as a driving voltage to the motor. The converter circuit comprises: a rectifier circuit for rectifying an output voltage of an AC power supply, which is applied to the input terminals, and outputting the rectified voltage to the output terminals; a first capacitor connected between the output terminals; a second capacitor having an end connected to one of the output terminals; and a switch circuit for switching the connections between the other end of the second-capacitor and the one and the other input terminals so that the output voltage of the AC power supply is applied to the second capacitor, while a sum voltage of the terminal voltage of the second capacitor and the output voltage of the AC power supply is applied to the first capacitor, at a cycle that is shorter than the cycle of the AC power supply. Therefore, it is possible to significantly reduce the capacitances of the respective capacitors which are required for generating a voltage that is twice as high as the input voltage in this converter circuit. Further, the reduction in the capacitances of the capacitors in the converter circuit leads to a reduction in the capacitance of a reactor which is used for improving the power factor of the converter circuit. As a result, it is possible to realize a compact converter circuit in which the capacitors and the reactor, which occupy a greater part of the volume of the converter circuit, are reduced in size, leading to a reduction in size of the motor driving apparatus.

According to a tenth aspect of the present invention, in the motor driving apparatus according to an eighth aspect, the switch circuit repeatedly turns the first and second switching elements on and off alternately so that the first and second capacitors are alternately charged, and the capacitances of the first and second capacitors are set to such large values that the terminal voltages of the first and second capacitors do not drop to zero during one switching period of the switching elements when the motor is at the maximum output. Therefore, the boosting operation of the converter circuit can be ensured over the whole driving area of the motor.

According to an eleventh aspect of the present invention, in the motor driving apparatus according to the eighth aspect, the switch circuit repeatedly turns the first and second switching elements on and off alternately so that the first and second capacitors are alternately charged, and the switching cycle of the switching elements is set to such a short period that the terminal voltages of the first and second capacitors do not drop to zero when the motor is at the maximum output. Therefore, the boosting operation of the converter circuit can be ensured over the whole driving area of the motor.

According to a twelfth aspect of the present invention, in the motor driving apparatus according to the eighth aspect, the switch circuit stops the on-off operations of the first and second switching elements when the torque of the motor satisfies a required torque. Therefore, power loss in the converter circuit can be minimized. That is, since the boosting operation of the converter circuit is stopped in a low load area where no boosting operation is needed, only the rectifier circuit can be operated to improve the operation efficiency of the converter circuit.

According to a thirteenth aspect of the present invention, in the motor driving apparatus according to the twelfth aspect, the switch circuit judges whether the torque of the motor is excessive or deficient, on the basis of the voltage supplied to the motor. Therefore, it is possible to easily judge as to whether the torque of the motor is excessive or deficient, whereby a switch circuit that operates according to the motor torque can easily be realized.

According to a fourteenth aspect of the present invention, in the motor driving apparatus according to the twelfth aspect, the switch circuit judges whether the torque of the motor is excessive or deficient, on the basis of an ordered rpm and an actual rpm of the motor. Therefore, it is possible to accurately detect as to whether the torque of the motor is excessive or deficient, whereby the switch circuit can correctly be operated according to the motor torque.

According to a fifteenth aspect of the present invention, in the motor driving apparatus according to the twelfth aspect, the switch circuit judges whether the torque of the motor is excessive or deficient, on the basis of the amplitude of a current supplied to the motor. Therefore, a switch circuit that operates according to the motor torque can easily be realized.

According to a sixteenth aspect of the present invention, in the motor driving apparatus according to the eighth embodiment, the switch circuit uses a power supply for driving the inverter circuit, as a power supply for driving the first and second switching elements. Therefore, it becomes unnecessary to prepare a special power supply for driving the first and second switching elements, whereby the number of components of the converter circuit is significantly reduced, resulting in reductions in circuit space and cost.

According to a seventeenth aspect of the present invention, in the motor driving apparatus according to the sixteenth aspect, a power supply for driving a lower-potential-side element between the first and second switching elements comprises a DC power supply for driving the inverter, a diode having an anode connected to a higher-potential-side terminal of the DC power supply, and a capacitor connected between a cathode of the diode and a lower-potential end of the lower-potential-side switching element. In addition, a power supply for driving a higher-potential-side element between the first and second switching elements comprises a diode having an anode connected to the cathode of the diode which is a component of the driving power supply for driving the lower-potential-side element, and a capacitor connected between a cathode of the diode and a connection node of the two switching elements. Therefore, a power supply for driving the first and second switching elements can be realized in a relatively simple circuit construction, whereby the number of components of the converter circuit is significantly reduced, resulting in reductions in circuit space and cost.

According to an eighteenth aspect of the present invention, in the motor driving apparatus according to the seventh aspect, the switch circuit changes the switching cycle for turning the first and second switching elements on and off, according to the output of the motor. Therefore, the converter circuit is able to carry out an appropriate boosting operation according to the motor output, whereby the operation efficiency of the converter circuit is improved.

According to a nineteenth aspect of the present invention, in the motor driving apparatus according to the eighth aspect, the switching cycle for turning the first and second switching elements on and off is equal to the switching cycle for turning on and off the switching elements which are components of the inverter circuit. Therefore, the frequency of the harmonic current that occurs in the motor driving apparatus is unified, whereby the number of noise filters to be provided at the input end is also unified, resulting in a significant cost reduction.

According to a twentieth aspect of the present invention, in the motor driving apparatus according to the eighth aspect, the switch circuit turns the first and second switching elements on and off so that harmonic components of the current inputted to the converter circuit are decreased. Since the harmonic current is reduced, a noise filter to be provided at the input end can be reduced in size, or dispensed with.

According to a twenty-first aspect of the present invention, in the motor driving apparatus according to the eighth aspect, the diodes as components of the rectifier circuit have an inverse recovery time as short as that of the diodes constituting the switch circuit. Therefore, it is possible to reduce losses at commutation in the rectifier circuit in which a cut-off of current is carried out for every carrier period of the first and second switching elements, whereby operation efficiency of the rectifier circuit is improved.

According to a twenty-second aspect of the present invention, in the motor driving apparatus according to the eighth aspect, the converter circuit includes a capacitor for charging a regenerative current that occurs when the motor is stopped, where such capacitor is connected to the output end of the converter circuit. Therefore, it is possible to prevent the inverter from being destroyed due to the regenerative current even when the motor is suddenly stopped, whereby reliability of the motor driving apparatus is improved.

According to a twenty-third aspect of the present invention, in the motor driving apparatus according to the eighth aspect, the switch circuit is a switching module which is obtained by modularizing the first to fourth diodes, and the first and second switching elements. Therefore, the motor driving apparatus that does not need boosting and the motor driving apparatus that needs boosting can share the circuit substrate, whereby design efficiency is enhanced.

According to a twenty-fourth aspect of the present invention, in the motor driving apparatus according to the twenty-third aspect, the switching module is operated with a driving signal that is supplied from an inverter drive unit for driving the inverter circuit. Therefore, it becomes unnecessary to provide a special apparatus for driving the switching module, resulting in a cost reduction.

According to a twenty-fifth aspect of the present invention, in the motor driving apparatus according to the eighth aspect, the converter circuit includes a reactor for cutting off noises that occur in the switch circuit included in the converter circuit, where such reactor is connected to the input end of the converter circuit. Therefore, the power factor of the input current is increased, whereby occurrence of a harmonic current at the input end can be reduced.

According to a twenty-sixth aspect of the present invention, in the motor driving apparatus according to the twenty-fifth aspect, the switch circuit turns the first and second switching elements on and off so that the on periods of both the elements are overlapped, thereby to boost the output voltage of the converter circuit to double or more of the output voltage of the AC power supply. Therefore, it is possible to drive a motor that requires a voltage that is twice or more as high as the power supply voltage.

According to a twenty-seventh aspect of the present invention, in the motor driving apparatus according to the eighth aspect, the inverter circuit controls a supply current to the motor so as to increase the power factor of the current inputted to the converter circuit. Therefore, the power factor of the input current is increased, whereby occurrence of a harmonic current at the input end can be reduced.

According to a twenty-eighth aspect of the present invention, in the motor driving apparatus according to the eighth aspect, the switch circuit turns the first and second switching elements on and off so as to increase the power factor of the current inputted to the converter circuit. Therefore, the power factor of the input current is increased, whereby occurrence of a harmonic current at the input end can be reduced.

According to a twenty-ninth aspect of the present invention, there is provided a compressor for receiving a voltage from an AC power supply. The compressor comprises a motor, a motor driving apparatus for driving the motor. The motor driving apparatus is a motor driving apparatus according to the seventh aspect of the present invention. Therefore, the capacitances of the capacitors used in the converter circuit of the motor driving apparatus can be reduced, whereby the motor driving apparatus is reduced in size and cost, leading to reductions in size and cost of the compressor.

According to a thirtieth aspect of the present invention, there is provided an air conditioner for receiving a voltage from an AC power supply, and having a compressor. The air conditioner comprises a motor driving apparatus for driving a motor of the compressor. The motor driving apparatus is a motor driving apparatus according to the seventh aspect of the present invention. Therefore, the capacitances of the capacitors used in the converter circuit of the motor driving apparatus can be reduced, whereby the motor driving apparatus is reduced in size and cost, leading to reductions in size and cost of the refrigerator.

According to a thirty-first aspect of the present invention, there is provided a refrigerator for receiving a voltage from an AC power supply, and having a compressor. The refrigerator comprises a motor driving apparatus for driving a motor of the compressor. The motor driving apparatus is a motor driving apparatus according to the seventh aspect of the present invention. Therefore, the capacitances of the capacitors used in the converter circuit of the motor driving apparatus can be reduced, whereby the motor driving apparatus is reduced in size and cost, leading to reductions in size and cost of the compressor.

According to a thirty-second aspect of the present invention, there is provided an electric washing machine for receiving a voltage from an AC power supply. The electric washing machine comprises a motor, and a motor driving apparatus for driving a motor of the compressor. The motor driving apparatus is a motor driving apparatus according to the seventh aspect of the present invention. Therefore, the capacitances of the capacitors used in the converter circuit of the motor driving apparatus can be reduced, whereby the motor driving apparatus is reduced in size and cost, leading to reductions in size and cost of the washing machine.

According to a thirty-third aspect of the present invention, there is provided an air blower for receiving a voltage from an AC power supply. The air blower comprises a motor, and a motor driving apparatus for driving the motor. The motor driving apparatus is a motor driving apparatus according to the seventh aspect of the present invention. Therefore, the capacitances of the capacitors used in the converter circuit of the motor driving apparatus can be reduced, whereby the size and cost of the air blower can be reduced.

According to a thirty-fourth aspect of the present invention, there is provided an electric vacuum cleaner for receiving a voltage from an AC power supply. The electric vacuum cleaner comprises a motor, and a motor driving apparatus for driving the motor. The motor driving apparatus is a motor driving apparatus according to the seventh aspect of the present invention. Therefore, the capacitances of the capacitors used in the converter circuit of the motor driving apparatus can be reduced, whereby the size and cost of the vacuum cleaner can be reduced.

According to a thirty-fifth aspect of the present invention, there is provided a heat-pump type hot-water supply unit for receiving a voltage from an AC power supply, and having a compressor. The heat-pump type hot-water supply unit comprises a motor driving apparatus for driving a motor of the compressor. The motor driving apparatus is a motor driving apparatus according to the seventh aspect of the present invention. Therefore, the capacitances of the capacitors used in the converter circuit of the motor driving apparatus can be reduced, whereby the motor driving apparatus is reduced in size and cost, leading to reductions in size and cost of the heat-pump type hot-water supply unit.

DETAILED DESCRIPTION OF THE PREFERRED EMBODIMENTS

First Embodiment

Figure 1:
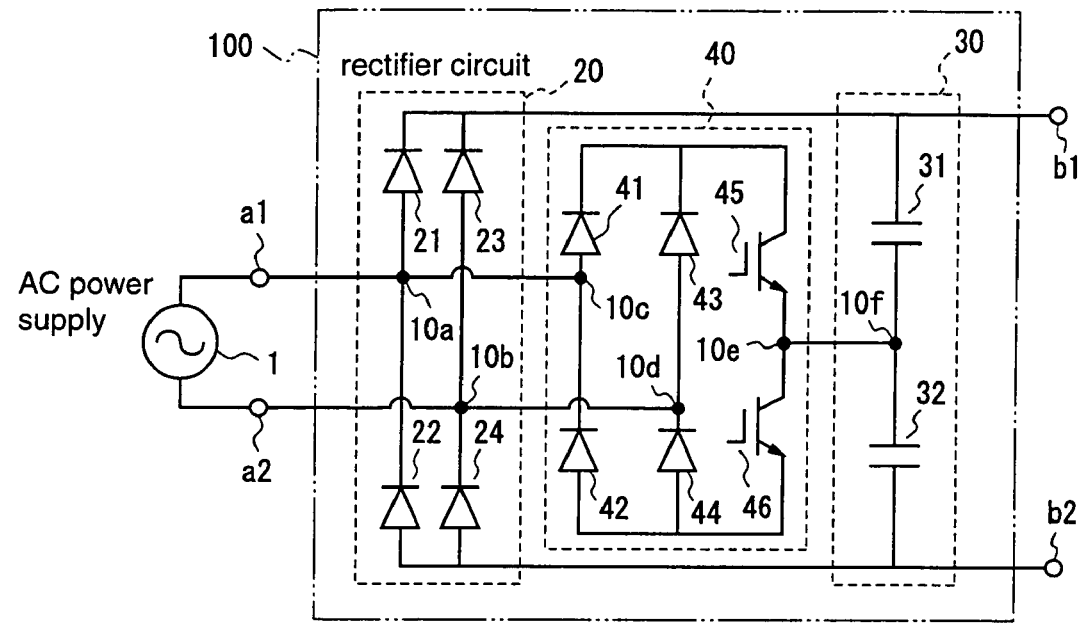
FIG. 1 is a diagram for explaining a converter circuit according to a first embodiment of the present invention.

FIG. 1 is a diagram for explaining a converter circuit according to a first embodiment of the present invention.

The converter circuit 100 according to the first embodiment receives an AC voltage supplied from an AC power supply 1, and converts the input voltage into a non-negative voltage that is equal to or larger than the amplitude of the input voltage. The converter circuit 100 has a pair of input terminals a1 and a2 to which the output voltage of the AC power supply 1 is applied, and a pair of output terminals b1 and b2 from which the non-negative voltage equal to or larger than the amplitude of the input voltage is output.

To be specific, the converter circuit 100 comprises: a rectifier circuit 20 for rectifying the output voltage of the AC power supply 1, which is applied to the input terminals a1 and a2; first and second capacitors 31 and 32 which are connected in series between the output terminals b1 and b2; and a switch circuit 40 for connecting a connection node 10f of the first and second capacitors 31 and 32 to the two input terminals a1 and a2, alternately, so that charging of the first capacitor 31 and charging of the second capacitor 32 are alternately repeated by the output voltage of the AC power supply 1 at a cycle that is shorter than the cycle of the output voltage of the AC power supply 1. The first and second capacitors 31 and 32 constitute a capacitor circuit 30 for generating an output voltage between the output terminals b1 and b2.

Figure 17:
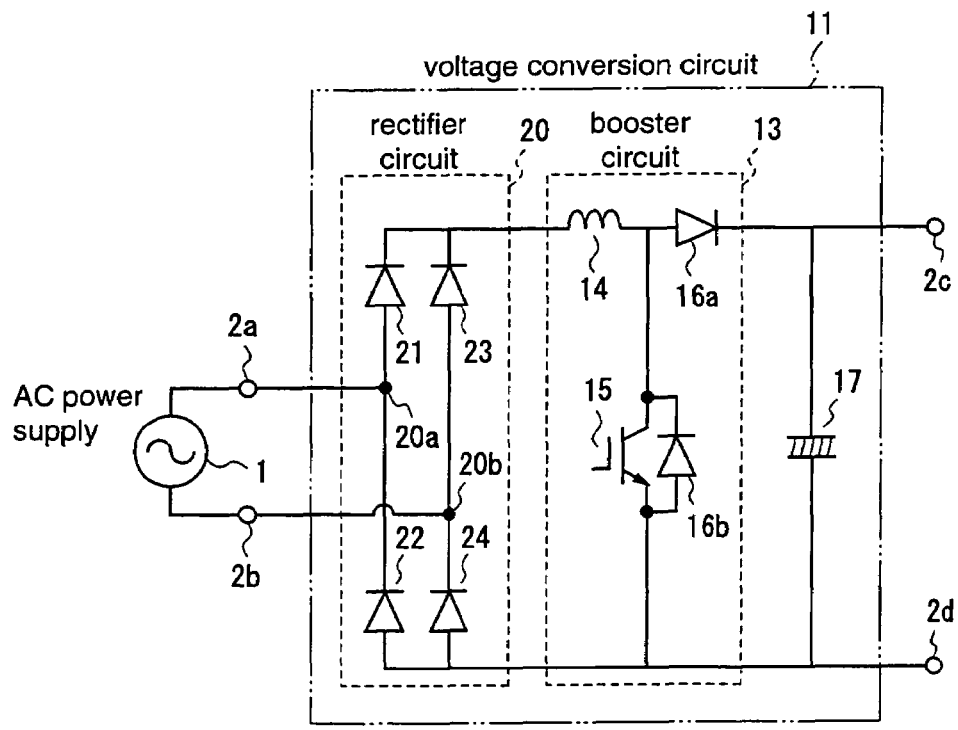
FIG. 17 is a diagram for explaining a conventional voltage conversion circuit.

The rectifier circuit 20 comprises four diodes 21 to 24, similar to the rectifier circuit of the conventional voltage conversion circuit 11 shown in FIG. 17. A connection node 10a of the diodes 21 and 22 connected in series is connected to the input terminal a1, while a connection node 10b of the diodes 23 and 24 connected in series is connected to the input terminal a2. Further, the cathodes of the diodes 21 and 23 are connected to each other, and the connection node of the diodes 21 and 23 is connected to the output terminal b1. The anodes of the diodes 22 and 24 are connected to each other, and the connection node of the diodes 22 and 24 is connected to the output terminal b2.

The switch circuit 40 comprises: first and second switching elements 45 and 46 connected in series; first and second diodes 41 and 42 which are connected in series with each other and in parallel with the switching elements 45 and 46 connected in series; and third and fourth diodes 43 and 44 which are connected in series with each other and in parallel with the switching elements 45 and 46 connected in series. A connection node 10c of the first and second diodes 41 and 42 is connected to the input terminal a1, and a connection node 10d of the third and fourth diodes 43 and 44 is connected to the input terminal a2. Further, a connection node 10e of the switching elements 45 and 46 is connected to the connection node 10f of capacitors 31 and 32, which are connected in series and constitute the capacitor circuit 30. In this first embodiment, IGBTs (Insulating Gate Bipolar Transistors) are used as the switching elements 45 and 46.

Next, the operation of the converter circuit 100 will be described.

When the output voltage of the AC power supply 1 is applied to the input terminals a1 and a2 of the converter circuit 100, the output voltage of the AC power supply 1 is rectified by the rectifier circuit 20 of the converter circuit 100, and the capacitors 31 and 32 of the capacitor circuit 30 are charged by the output of the rectifier circuit 20 so that the potential at the output terminal b1 becomes higher than the potential at the output terminal b2.

That is, when the potential at the input terminal a1 is higher than the potential at the input terminal a2, a current flows from the input terminal a1 through the diode 21, the capacitor circuit 30, and the diode 24 to reach the input terminal a2, by the output voltage of the AC power supply 1, in the converter circuit 100. On the other hand, when the potential at the input terminal a1 is lower than the potential at the input terminal a2, a current flows from the input terminal a2 through the diode 23, the capacitor circuit 30, and the diode 22 to reach the input terminal a1, by the output voltage of the AC power supply 1, in the converter circuit 100. Thereby, the two capacitors 31 and 32 in the capacitor circuit 30 are charged.

At this time, when on-off of the first and second switching elements 45 and 46 in the switch circuit 40 is complementarily carried out so that one is turned on while the other one is turned off according to a switch control signal (not shown), the first and second capacitors 31 and 32 in the capacitor circuit 30 are alternately charged by the output voltage of the AC power supply 1. It is assumed that on-off of the switching elements 45 and 46 is carried out at a cycle (e.g., 1/1000 (sec)) that is shorter than the cycle (1/60 (sec)) corresponding to the frequency (60 Hz) of the AC power supply 1. That is, the output voltage of the AC power supply 1 is applied to each of the first and second capacitors 31 and 32 at a cycle that is shorter than the cycle of the AC power supply 1, by turning the first and second switching elements 45 and 46 on and off.

Hereinafter, current flow in the switch circuit 40 and the capacitor circuit 30 will be described with respect to two cases having different polarities of the output voltage of the AC power supply.

Initially, a description will be given of the case where the potential at the input terminal a1 of the converter circuit 100 is higher than the potential at the other input terminal a2.

When the switching element 45 is turned on and the switching element 46 is turned off, a current flows from the input terminal a1 through the diode 41, the switching element 45, the second capacitor 32, and the diode 24 to reach the input terminal a2, whereby the second capacitor 32 is charged by the output voltage of the AC power supply 1 so that the potential at the connection node 10f becomes higher than the potential at the output terminal b2.

On the other hand, when the switching element 45 is turned off and the switching element 46 is turned on, a current flows from the input terminal a1 through the diode 21, the first capacitor 31, the switching element 46, and the diode 44 to reach the input terminal a2, whereby the first capacitor 31 is charged by the output voltage of the AC power supply 1 so that the potential at the output terminal b1 becomes higher than the potential at the connection node 10f.

Thereby, a sum voltage of the terminal voltage of the first capacitor 31 and the terminal voltage of the second capacitor 32 is generated between the output terminals b1 and b2 of the capacitor circuit 100, and the maximum value of this sum voltage is double the input voltage.

Next, a description will be given of the case where the potential at the input terminal a1 of the converter circuit 100 is lower than the potential of the other input terminal a2.

When the switching element 45 is turned on and the switching element 46 is turned off, a current flows from the input terminal a2 through the diode 43, the switching element 45, the second capacitor 32, and the diode 22 to reach the input terminal a1, whereby the second capacitor 32 is charged by the output voltage of the AC power supply 1 so that the potential at the connection node 10f becomes higher than the potential at the output terminal b2.

On the other hand, when the switching element 45 is turned off and the switching element 46 is turned on, a current flows from the input terminal a2 through the diode 23, the first capacitor 31, the switching element 46, and the diode 42 to reach the input terminal a1, whereby the first capacitor 31 is charged by the output voltage of the AC power supply 1 so that the potential at the output terminal b1 becomes higher than the potential at the connection node 10f.

Thereby, a sum voltage of the terminal voltage of the first capacitor 31 and the terminal voltage of the second capacitor 32 is generated between the output terminals b1 and b2 of the capacitor circuit 100, and the maximum value of this sum voltage is double the input voltage.

As a result, regardless of the polarity of the output voltage of the AC power supply 1, a rectified voltage that is higher than the output voltage of the AC power supply applied to the input terminals a1 and a2 is output from the output terminals b1 and b2.

As described above, the converter circuit 100 according to the first embodiment is provided with the rectifier circuit 20 for rectifying the output voltage of the AC power supply 1, the first and second capacitors 31 and 32 connected in series for smoothing the output of the rectifier circuit 20, and the switch circuit 40 for switching the connections of the capacitors 31 and 32 with the AC power supply 1 so that the first and second capacitors 31 and 32 are alternately charged at a cycle that is shorter than the cycle of the output voltage of the AC power supply 1. Therefore, the number of charging times per unit time for the capacitors 31 and 32 connected in series becomes larger than the frequency of the AC power supply 1, whereby the capacitances of the capacitors 31 and 32 which are required for generating a voltage that is twice as high as the input voltage can be reduced.

Further, since the output voltage of the AC power supply 1 is alternately applied to the first and second capacitors 31 and 32, either of the two capacitors is always charged. Therefore, charging of the capacitors for generating a voltage that is double the input voltage can be carried out with efficiency, whereby the capacitances of the capacitors can be further reduced.

Furthermore, since the sum voltage of the terminal voltages of the first and second capacitors 31 and 32 connected in series is the output voltage of the converter circuit 100, the withstand voltages of the respective capacitors 31 and 32 can be reduced to about half the maximum output voltage of the converter circuit 100.

While in this first embodiment the capacitor circuit 30 comprises two capacitors connected in series, the capacitor circuit 30 is not restricted thereto. For example, the capacitor circuit 30 may comprise three or more capacitors. In this case, the connection node 10e of the switch circuit 40 may be connected to any connection node as long as it is a connection node of capacitors connected in series. Further, the capacitor circuit 30 may be constituted by replacing the first and second capacitors with first and second capacitor units each comprising plural capacitors.

While in this first embodiment IGBTs are used as the switching elements 45 and 46 constituting the switch circuit 40, the switching elements 45 and 46 are not restricted thereto. The switching elements 45 and 46 may be implemented by any circuit element that cuts off the current path, such as an FET that electrically cuts off the current path, or a relay that physically cuts off the current path.

While in this first embodiment the first and second switching elements 45 and 46 are complementarily turned on and off in the switch circuit 40, the switch circuit 40 may have a period during which both of the first and second switching elements 45 and 46 are turned off.

Second Embodiment

Figure 2:
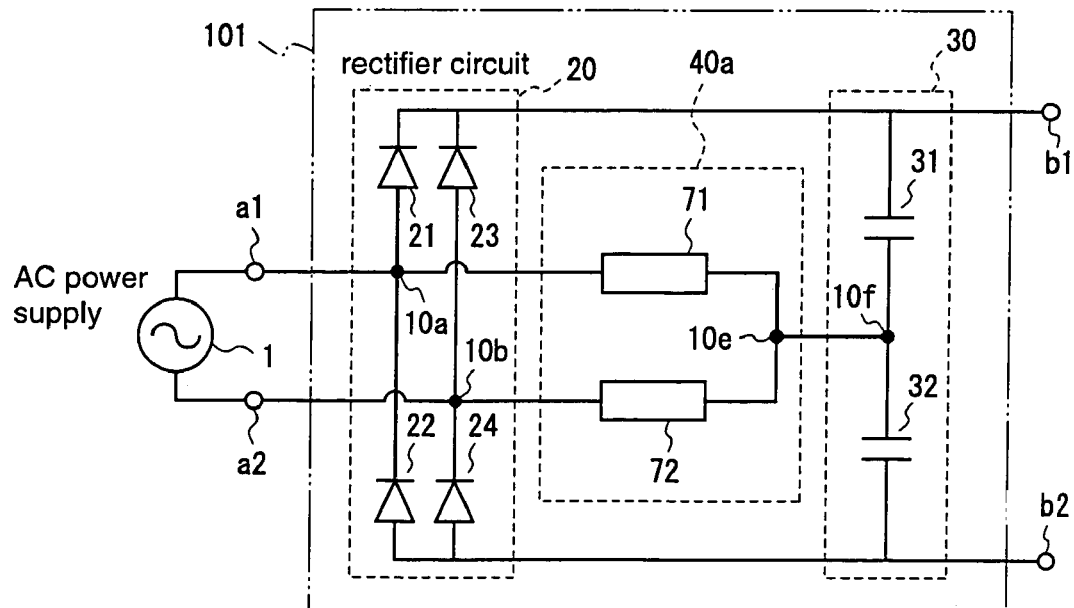
FIG. 2 is a diagram for explaining a converter circuit according to a second embodiment of the present invention.

FIG. 2 is a block diagram for explaining a converter circuit according to a second embodiment of the present invention.

The converter circuit 101 according to the second embodiment boosts the output voltage of the AC power supply 1 similar to the converter circuit 100 according to the first embodiment, and the converter circuit 101 is composed of a rectifier circuit 20, a capacitor circuit 30, and a switch circuit 40a.

The rectifier circuit 20 and the capacitor circuit 30 are identical to those of the first embodiment. The switch circuit 40a comprises a first bidirectional switching element 71 which is connected between the input terminal a1 of the converter circuit 101 and the connection node 10f of the capacitor circuit 30, and a second bidirectional switching element 72 which is connected between the input terminal a2 of the converter circuit 101 and the connection node 10f of the capacitor circuit 30.

In the switch circuit 40a, on-off of the first and second bidirectional switching elements 71 and 72 is complementarily repeated so that one is turned off while the other is turned on. At this time, the on-off repetition is carried out at a cycle (e.g., 1/1000 (sec)) that is shorter than a cycle (1/60 (sec)) corresponding to the frequency of the AC power supply 1 (e.g., 60 Hz), similar to the switch circuit 40 of the first embodiment.

Next, the operation of the converter circuit 101 will be described.

In this second embodiment, since the operations other than that of the switch circuit 40a are identical to those described for the first embodiment, only the operation of the switch circuit 40a will be described hereinafter with respect to the two cases having different polarities of the output voltage of the AC power supply 1.

When the voltage at an input terminal a1 of the converter circuit 101 is higher than the voltage at the other input terminal a2 thereof, if the first bidirectional switching element 71 is turned on and the second bidirectional switching element 72 is turned off, a current flows from the input terminal a1 through the first bidirectional switching element 71, the second capacitor 32, and the diode 24 to reach the input terminal a2, whereby the second capacitor 32 is charged by the output voltage of the AC power supply 1 so that the voltage at the connection node 10f becomes higher than the voltage at the output terminal b2.

On the other hand, when the first bidirectional switching element 71 is turned off and the second bidirectional switching element 72 is turned on, a current flows from the input terminal a1 through the diode 21, the first capacitor 31, and the second bidirectional switching element 72 to reach the input terminal a2, whereby the first capacitor 31 is charged by the output voltage of the AC power supply 1 so that the voltage at the output terminal b1 becomes higher than the voltage at the connection node 10*f*.

Further, when the voltage at the input terminal a1 of the converter circuit 101 is lower than the voltage at the input terminal a2 thereof, if the first bidirectional switching element 71 is turned on and the second bidirectional switching element 72 is turned off, a current flows from the input terminal a2 through the diode 23, the first capacitor 31, and the first bidirectional switching element 71 to reach the input terminal a1, whereby the second capacitor 32 is charged by the output voltage of the AC power supply so that the voltage at the connection node 10*f* becomes higher than the voltage at the output terminal b2.

On the other hand, when the first bidirectional switching element 71 is turned off and the second bidirectional switching element 72 is turned on, a current flows from the input terminal a2 through the second bidirectional switching element 72, the second capacitor 32, and the diode 22 to reach the input terminal a1, whereby the second capacitor 32 is charged by the output voltage of the AC power supply so that the voltage at the connection node 10*f* becomes higher than the voltage at the output terminal b2.

Thereby, a sum voltage of the terminal voltage of the first capacitor 31 and the terminal voltage of the second capacitor 32 is continuously generated between the two output terminals b1 and b2 of the converter circuit 101, and the sum voltage is double the input voltage at maximum.

As described above, the converter circuit 101 according to the second embodiment is provided with the switch circuit 40*a* comprising two bidirectional switches 71 and 72, instead of the switch circuit 40 comprising four diodes and two switching elements, which is included in the converter circuit 100 of the first embodiment. Therefore, as in the first embodiment, the capacitances of the capacitors 31 and 32 for generating a voltage that is double the input voltage can be reduced, and the withstand voltages of the respective capacitors 31 and 32 can be minimized.

Moreover, since the switch circuit 40*a* is composed of the two bidirectional switching elements 71 and 72, the number of components of the converter circuit can be reduced.

While in this second embodiment the switch circuit 40*a* comprises the first and second bidirectional switching elements 71 and 72 which are complementarily turned on and off, the switch circuit 40*a* may have a period during which both of the first and second switching elements 71 and 72 are turned off.

Third Embodiment

Figure 3:
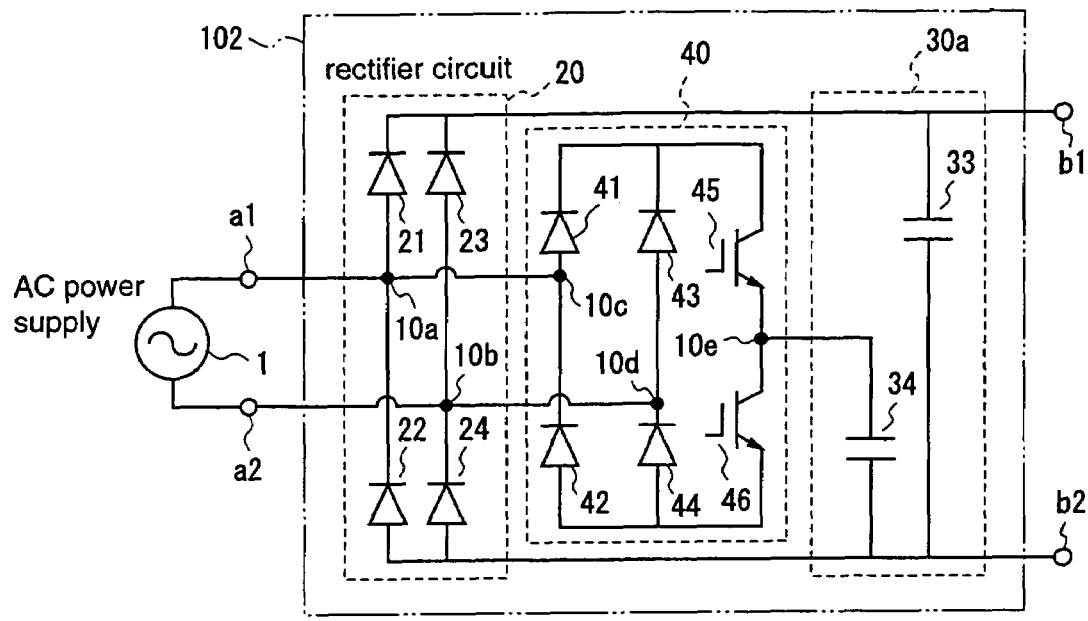
FIG. 3 is a diagram for explaining a converter circuit according to a third embodiment of the present invention.

FIG. 3 is a diagram for explaining a converter circuit according to a third embodiment of the present invention.

The converter circuit 102 according to the third embodiment boosts the output voltage of the AC power supply 1 similar to the converter circuit 100 according to the first embodiment, and the converter circuit 102 is composed of a rectifier circuit 20, a capacitor circuit 30*a*, and a switch circuit 40.

The rectifier circuit 20 and the switch circuit 40 are identical to those of the first embodiment. The capacitor circuit 30*a* comprises a third capacitor 33 connected between the output terminals b1 and b2, and a fourth capacitor 34 connected between the output terminal b2 and the connection node 10*e* of the first and second switching elements of the switch circuit 40. While the capacitor circuit 30*a* comprises the two capacitors 33 and 34, the capacitor circuit 30*a* may comprise third and fourth capacitor units each comprising plural capacitors connected, instead of the third and fourth capacitors.

Next, the operation of converter circuit 102 will be described.

When the output voltage of the AC power supply 1 is input to the input terminals a1 and a2 of the converter circuit 102, the output voltage is rectified by the rectifier circuit 20 in the converter circuit 102, and the capacitor 33 of the capacitor circuit 30*a* is charged by the output of the rectifier circuit 20 so that the voltage at the output terminal b1 becomes higher than the voltage at the output terminal b2.

That is, when the voltage at the input terminal a1 is higher than the voltage at the input terminal a2, a current flows in the converter circuit 102 from the input terminal a1 through the diode 21, the third capacitor 33, and the diode 24 to reach the input terminal a2 due to the output voltage of the AC power supply 1. On the other hand, when the voltage at the input terminal a1 is lower than the voltage at the input terminal a2, a current flows in the converter circuit 102 from the input terminal a2 through the diode 23, the third capacitor 33, and the diode 22 to reach the input terminal a1 due to the output voltage of the AC power supply 1. Thereby, the third capacitor 33 of the capacitor circuit 30*a* is charged.

At this time, on-off of the first and second switching elements 45 and 46 of the switch circuit 40 is complementarily carried out by a switch control signal (not shown) so that one of the switching elements 45 and 46 is turned off while the other one is turned on, whereby the third and fourth capacitors 33 and 34 of the capacitor circuit 30*a* are alternately charged. The on-off of the switching elements 45 and 46 is carried out at a cycle (e.g., $\frac{1}{1000}$ (sec)) that is shorter than a cycle ($\frac{1}{60}$ (sec)) corresponding to the frequency of the AC power supply 1 (e.g., 60 Hz). That is, by turning on and off the switching elements 45 and 46, the output voltage of the AC power supply 1 is applied to the fourth capacitor 34 while the sum voltage of the terminal voltage of the fourth capacitor 34 and the output voltage of the AC power supply 1 is applied to the third capacitor 33 at a cycle that is shorter than the cycle of the AC power supply 1.

Hereinafter, current flow in the switch circuit 40 and the capacitor circuit 30*a* will be described with respect to two cases having different polarities of the output voltage of the AC power supply 1.

Initially, a description will be given of the case where the voltage at one input terminal a1 of the converter circuit 102 is higher than the voltage at the other input terminal a2.

When the switching element 45 is turned on and the switching element 46 is turned off, a current flows from the input terminal a1 through the diode 41, the switching element 45, the fourth capacitor 34, and the diode 24 to reach the input terminal a2, whereby the fourth capacitor 34 is charged by the output voltage of the AC power supply 1 so that the voltage at the connection node 10*e* becomes higher than the voltage at the output terminal b2.

On the other hand, when the switching element 45 is turned off and the switching element 46 is turned on, a current flows from the input terminal a1 through the diode 21, the third capacitor 33, the fourth capacitor 34, the switching element 46, and the diode 44 to reach the input terminal a2, whereby the third capacitor 33 is charged by the sum voltage of the output voltage of the AC power supply 1 and the terminal voltage of the fourth capacitor 34 so that the voltage at the output terminal b1 becomes higher than the voltage at the output terminal b2.

Thereby, when the voltage at the input terminal a1 is higher than the voltage at the input terminal a2, a terminal voltage of the third capacitor 33, which is charged by the output voltage of the AC power supply 1 and the terminal voltage of the fourth capacitor 34, is generated between the output terminals b1 and b2 of the converter circuit 102, and this terminal voltage is double the input voltage at maximum.

Next, a description will be given of the case where the voltage at the input terminal a1 is lower than the voltage at the input terminal a2.

When the switching element 45 is turned on and the switching element 46 is turned off, a current flows from the input terminal a2 through the diode 41, the switching element 45, the fourth capacitor 34, and the diode 22 to reach the input terminal a1, whereby the fourth capacitor 34 is charged by the output voltage of the AC power supply 1 so that the voltage at the connection node 10e becomes higher than the voltage at the output terminal b2.

On the other hand, when the switching element 45 is turned off and the switching element 46 is turned on, a current flows from the input terminal a2 through the diode 23, the third capacitor 33, the fourth capacitor 34, the switching element 46, and the diode 42 to reach the input terminal a1, whereby the third capacitor 33 is charged by the sum voltage of the output voltage of the AC power supply 1 and the terminal voltage of the fourth capacitor 34 so that the voltage at the output terminal b1 becomes higher than the voltage at the output terminal b2.

Thereby, even when the voltage at the input terminal a1 is lower than the voltage at the input terminal a2, a terminal voltage of the third capacitor 33, which is charged by the output voltage of the AC power supply 1 and the terminal voltage of the fourth capacitor 34, is generated between the output terminals b1 and b2 of the converter circuit 102, and this terminal voltage is double the input voltage at maximum.

As a result, regardless of the polarity of the output voltage of the AC power supply 1, a rectified voltage, which is higher than the output voltage of the AC power supply 1 that is applied to the input terminals a1 and a2, is output from the output terminals b1 and b2 of the converter circuit 102.

As described above, the converter circuit 102 according to the third embodiment is provided with the rectifier circuit 20 for rectifying the output voltage of the AC power supply 1, the third capacitor 33 connected between the output terminals b1 and b2, the fourth capacitor 34 having an end connected to the output terminal b2, and the switch circuit 40a for connecting the terminal 10e of the fourth capacitor 34 alternately to the input terminals a1 and a2 of the AC power supply 1 so that the output voltage of the AC power supply 1 is applied to the fourth capacitor 34 while the sum voltage of the terminal voltage of the fourth capacitor 34 and the output voltage of the AC power supply 1 is applied to the third capacitor 33 at a cycle that is shorter than the cycle of the output voltage of the AC power supply 1. Therefore, the number of charging times per unit time for the capacitors 33 and 34 becomes larger than the frequency of polarity inversion of the AC power supply 1, whereby the capacitances of the both capacitors 33 and 34 can be reduced as compared with the case where the capacitors 33 and 34 are alternately charged at every polarity inversion of the AC power supply 1.

Further, in this third embodiment, since the output voltage of the AC power supply 1 is applied to the fourth capacitor 34 during one half period of the switching cycle while the sum voltage of the terminal voltage of the fourth capacitor 34 and the output voltage of the AC power supply 1 is applied to the third capacitor 33 during the other half period of the switching cycle, either of the two capacitors is always charged as in the first embodiment. Therefore, charging of the capacitors for generating a voltage that is double the input voltage can be carried out with efficiency, and the capacitances of the capacitors can be further reduced.

Furthermore, in the converter circuit 102 according to the third embodiment, the terminal voltage of the fourth capacitor 34 is used for boosting the terminal voltage of the third capacitor 33, and the terminal voltage of the third capacitor 33 is the output voltage of the converter circuit 102. Therefore, the converter circuit 102 is constructed such that the two capacitors for generating the output voltage have different capacitances from each other, whereby the converter circuit 102 is made resistant to variations in capacitances of the two capacitors, and is easily manufactured. Moreover, in the circuit construction according to the third embodiment, only the capacitor 33 that is a component of the capacitor circuit 30a is connected between the output terminals b1 and b2 of the converter circuit 102, whereby the capacitances of the capacitors 33 and 34 can be further reduced as compared with the circuit construction in which plural capacitors are connected in series between the output terminals b1 and b2.

While in this third embodiment the first and second switching elements 45 and 46 are complementarily turned on and off in the switch circuit 40, the switch circuit 40 may have a period during which both of the first and second switching elements 45 and 46 are turned off.

Fourth Embodiment

Figure 4:
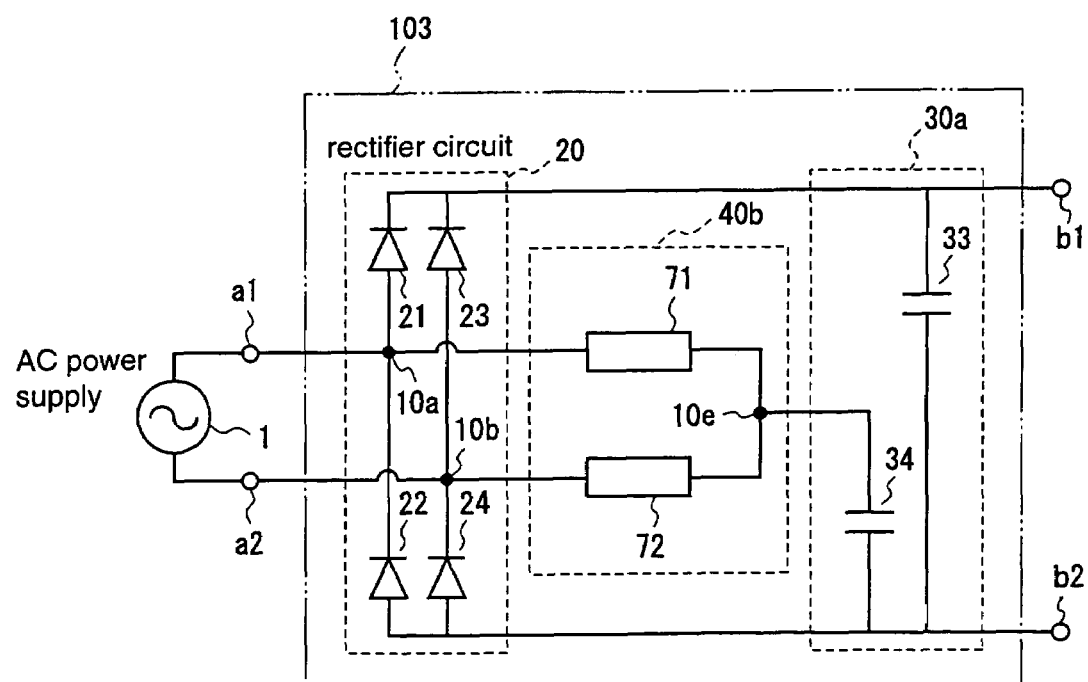
FIG. 4 is a diagram for explaining a converter circuit according to a fourth embodiment of the present invention.

FIG. 4 is a diagram for explaining a converter circuit according to a fourth embodiment of the present invention.

The converter circuit 103 of the fourth embodiment boosts the output voltage of the AC power supply 1 similar to the converter circuit 102 of the third embodiment, and comprises a rectifier circuit 20, a capacitor circuit 30a, and a switch circuit 40b.

The rectifier circuit 20 and the capacitor circuit 30a are identical to those of the third embodiment. The switch circuit 40b comprises a first bidirectional switching element 71 which is connected between the input terminal a1 of the converter circuit 103 and the connection node 10e of the fourth capacitor of the capacitor circuit 30a, and a second bidirectional switching element 72 which is connected between the input terminal a2 of the converter circuit 103 and the connection node 10e of the capacitor circuit 30a, similar to the switch circuit 40a according to the second embodiment.

In the switch circuit 40b, on-off of the first and second bidirectional switching elements 71 and 72 is complementarily repeated so that one of the switching elements 71 and 72 is turned off while the other one is turned on. At this time, the on-off repetition is carried out at a cycle (e.g., 1/1000 (sec)) that is shorter than a cycle (1/60 (sec)) corresponding to the frequency of the AC power supply 1 (e.g., 60 Hz). That is, by turning the first and second bidirectional switching elements 71 and 72 on and off, the output voltage of the AC power supply 1 is applied to the fourth capacitor 34 while the sum voltage of the terminal voltage of the fourth capacitor 34 and the output voltage of the AC power supply 1 is applied to the third capacitor 33 at a cycle that is shorter than the cycle of the AC power supply 1.

Next, the operation of the converter circuit 103 will be described.

In this fourth embodiment, since the operations other than that of the switch circuit 40b are identical to those described for the third embodiment, the operation of the switch circuit 40b will be mainly described hereinafter with respect to two cases having different polarities of the output voltage of the AC power supply 1.

When the voltage of one input terminal a1 of the converter circuit 103 is higher than the voltage at the other input terminal a2 thereof, if the first bidirectional switching element 71 is turned on and the second bidirectional switching element 72 is turned off, a current flows from the input terminal a1 through the first bidirectional switching element 71, the fourth capacitor 34, and the diode 24 to reach the input terminal a2, whereby the fourth capacitor 34 is charged by the output voltage of the AC power supply 1 so that the voltage at the connection node 10e becomes higher than the voltage at the output terminal b2.

On the other hand, when the first bidirectional switching element 71 is turned off and the second bidirectional switching element 72 is turned on, a current flows from the input terminal a1 through the diode 21, the third capacitor 33, the fourth capacitor 34, and the second bidirectional switching element 72 to reach the input terminal a2, whereby the third capacitor 33 is charged by the sum voltage of the output voltage of the AC power supply 1 and the terminal voltage of the capacitor 34 so that the voltage at the output terminal b1 becomes higher than the voltage at the output terminal b2.

Thereby, when the voltage at the input terminal a1 is higher than the voltage at the input terminal a2, a terminal voltage of the third capacitor 33, which is charged by the output voltage of the AC power supply 1 and the terminal voltage of the fourth capacitor 34, is generated between the output terminals b1 and b2 of the converter circuit 103, and this terminal voltage is double the input voltage at maximum.

Further, when the voltage at the input terminal a1 of the converter circuit 103 is lower than the voltage at the input terminal a2 thereof, if the first bidirectional switching element 71 is turned on and the second bidirectional switching element 72 is turned off, a current flows from the input terminal a2 through the second bidirectional switching element 72, the fourth capacitor 34, and the diode 22 to reach the input terminal a1, whereby the fourth capacitor 34 is charged by the output voltage of the AC power supply 1 so that the voltage at the connection node 10e becomes higher than the voltage at the output terminal b2.

On the other hand, when the first bidirectional switching element 71 is turned on and the second bidirectional switching element 72 is turned off, a current flows from the input terminal a2 through the diode 23, the third capacitor 33, the fourth capacitor 34, and the first bidirectional switching element 71 to reach the input terminal a1, whereby the third capacitor 33 is charged by the sum voltage of the output voltage of the AC power supply 1 and the terminal voltage of the capacitor 34 so that the voltage at the output terminal b1 becomes higher than the voltage at the output terminal b2.

Thereby, even when the voltage at the input terminal a1 is lower than the voltage at the other input terminal a2, a terminal voltage of the third capacitor 33, which is charged by the sum voltage of the output voltage of the AC power supply 1 and the terminal voltage of the fourth capacitor 34, is generated between the output terminals b1 and b2 of the converter circuit 103, and this terminal voltage is double the input voltage at maximum.

As a result, regardless of the polarity of the output voltage of the AC power supply 1, a rectified voltage that is higher than the output voltage of the AC power supply 1 which is applied to the input terminals a1 and a2 is output from the output terminals b1 and b2 of the converter circuit 13.

As described above, the converter circuit 103 according to the fourth embodiment of the present invention is provided with the switch circuit 40b comprising two bidirectional switching elements 71 and 72, instead of the switch circuit 40 comprising four diodes and two switching element according to the third embodiment. Therefore, the capacitances of the capacitors which are required for generating a voltage that is double the input voltage can be reduced, as in the third embodiment, and further, the converter circuit 103 can be resistant to variations in the capacitances of the two capacitors, and be easily manufactured.

Furthermore, in this fourth embodiment, since the switch circuit 40b is composed of two bidirectional switching elements 71 and 72, the number of parts of the converter circuit can be reduced.

While in this fourth embodiment the first and second bidirectional switching elements 71 and 72 are complementarily turned on and off in the switch circuit 40b, the switch circuit 40b may have a period during which both of the first and second switching elements 71 and 72 are turned off.

Fifth Embodiment

Figure 5:
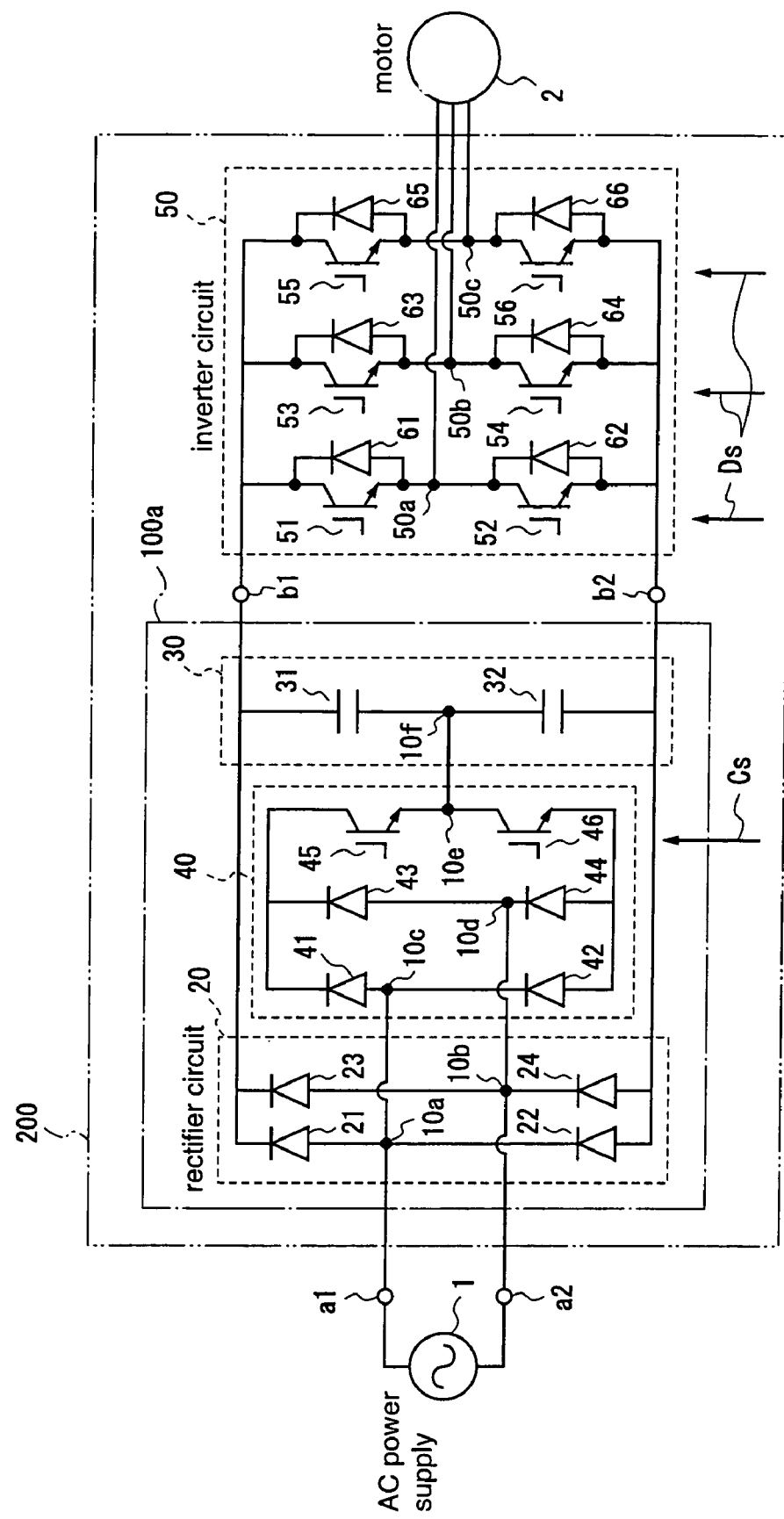
FIG. 5 is a diagram for explaining a converter circuit according to a fifth embodiment of the present invention.

FIG. 5 is a circuit diagram for explaining a motor driving apparatus according to a fifth embodiment of the present invention.

The motor driving apparatus 200 according to the fifth embodiment is provided with a converter circuit 100a that boosts an output voltage of an AC power supply 1, and an inverter circuit 50 that converts the boosted AC voltage into a three-phase AC voltage to be applied to a motor 2.

Hereinafter, the converter circuit 100a and the inverter circuit 50 will be described in detail.

The converter circuit 100a is identical to the converter circuit 100 according to the first embodiment. That is, the converter circuit 100a comprises: a rectifier circuit 20 for rectifying the output voltage of the AC power supply 1, which is applied to the input terminals a1 and a2, to output the rectified voltage to the output terminals b1 and b2; a capacitor circuit 30 for smoothing the output of the rectifier circuit 20, which is connected between the output terminals b1 and b2; and a switch circuit 40 for connecting a connection node 10f of first and second capacitors 31 and 32, which are components of the capacitor circuit 30 and are connected in series, alternately to the two input terminals a1 and a2 so that the first and second capacitors 31 and 32 are alternately charged with the output voltage of the AC power supply 1. The switch circuit 40 comprises four diodes 41 to 44 and two switching elements 45 and 46 as in the first embodiment, and the switching elements are turned on and off by a open-close control signal Cs supplied from a driving apparatus (not shown) for the switching elements. Accordingly, in the converter circuit 100a of the motor driving apparatus 200 according to the fifth embodiment, as in the first embodiment, by turning the first and second switching elements 45 and 46 on and off, the output voltage of the AC power supply 1 is applied to each of the first and second capacitors 31 and 32 at a cycle that is shorter than the cycle of the AC power supply 1.

The inverter circuit 50 has switching elements 51 and 52 connected in series, switching elements 53 and 54 connected in series, and switching elements 55 and 56 connected in series. One of the ends of the switching elements 51, 53, and 55 are connected to each other, and the connection node of the switching elements 51, 533, and 55 is connected to one output terminal b1 of the converter circuit 100a. One of the ends of the switching elements 52, 54, and 56 are connected to each other, and the connection node of the switching elements 52, 54, and 56 is connected to the other output terminal b2 of the converter circuit 100a. Further, diodes 61 to 66 are connected in inverse parallel to the respective switching elements 51 to 56. A connection node 50a of the switching elements 51 and 52 is a first output node of the inverter circuit 50, a connection node 50b of the switching elements 53 and 54 is a second output node of the inverter circuit 50, and a connection node 50c of the switching elements 55 and 56 is a third output node of the inverter circuit 50. The first to third output nodes 50a to 50c of the inverter circuit 50 are connected to input nodes of the respective phases of the three-phase motor 2. The switching elements are IGBT (Insulated Gate type Bipolar Transistor) elements.

A typical circuit structure of the inverter circuit 50 comprises six pieces of circuit elements each comprising an IGBT (switching element) and a diode connected in inverse parallel to the IGBT as shown in FIG. 5. However, the switching elements may be FETs like MOSFETs, power transistors, and the like. Further, the type of the motor 2 is not restricted to that mentioned above.

The switching elements 51 to 56 as components of the inverter circuit 50 are turned on and off so that an AC voltage having a frequency according to the rpm (revolutions per minute) of the motor 2 is supplied from the inverter circuit 50 to the motor 2, by a drive signal Ds. The output of the motor 2 is controlled by the duty ratio of on-off of the switching elements.

Further, in this fifth embodiment, under the condition that the carrier cycle of the switch circuit 40, i.e., the cycle in which the first and second switching elements 45 and 46 are turned on and off alternately, is shorter than the cycle of the output voltage of the AC power supply 1, the capacitances of the capacitors 31 and 32 connected in series are set so that the terminal voltages of the capacitors 31 and 32 are not lowered to zero even when any motor is driven. Therefore, regardless of the type of the motor 2, the converter circuit 100a can output a voltage that is equal to or larger than the amplitude of the input voltage. The capacitances of the capacitors 31 and 32 are desired to be larger than the capacitance at which the terminal voltage of the capacitor is lowered to zero at the maximum output of the motor 2, that is, when the load to the converter circuit 100a is maximum, under the condition that the carrier cycle is shorter than the cycle of the output voltage of the AC power supply 1.

Next, the operation of the motor driving apparatus 200 will be described.

When the output voltage of the AC power supply 1 is applied to the motor driving apparatus 200 and the open-close control signal Cs is applied to the switching elements 45 and 46 while the drive signal Ds is applied to the switching elements 51 to 56 of the inverter circuit 50, the converter circuit 100a operates in a manner similar to the converter circuit 100 of the first embodiment to output a voltage that is equal to or higher than the power supply voltage.

Further, in the inverter circuit 50, the drive signal Ds is applied to the respective switching elements 51 to 56 as a gate signal, whereby the switching elements 51 to 56 are turned on and off. Then, in the inverter circuit 50, the output voltage of the converter circuit 100a is converted into a three-phase AC voltage, and the three-phase AC voltage is output to the motor 2, whereby the motor 2 is driven by the three-phase AC voltage.

Hereinafter, a description will be given of the carrier frequency of the switch circuit and the capacitances of the capacitors 31 and 32, in an example of use of the motor driving apparatus 200 according to the fifth embodiment.

For example, in the motor driving apparatus 200, when the carrier frequency of the switch circuit 40 is set to 10 kHz and the motor is driven with a motor load corresponding to a motor driving current of about 15 A, the capacitances of the respective capacitors 31 and 32 as components of the capacitor circuit 30 are about 4 µF.

Figure 16:
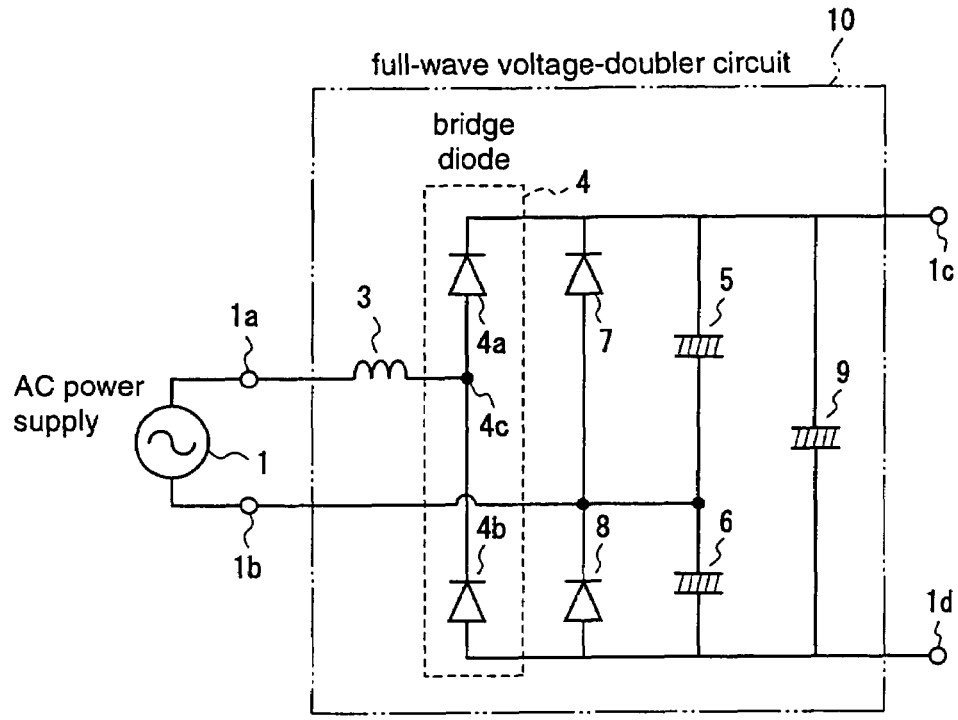
FIG. 16 is a diagram for explaining a conventional full-wave voltage-doubler circuit 10.

On the other hand, in order to drive the motor with the same motor load as mentioned above without operating the switch circuit 40 of the motor driving apparatus 200, a capacitance of about 1000 µF is required for the whole capacitor circuit 30 of the motor driving apparatus 200. That is, in the conventional full-wave voltage double circuit 10 having no switch circuit as shown in FIG. 16, the capacitance of the capacitor 9 must be about 1000 µF.

Further, in the conventional voltage conversion circuit 11 shown in FIG. 17, when driving the motor with the same motor load as described above, the capacitance of the capacitor 17 becomes about 100 µF which is considerably larger than the capacitances of the capacitors in the converter circuit 100a of the fifth embodiment, even if the switching frequency of the booster circuit 13 is equal to or higher than 20 kHz. The reason is as follows. In the booster circuit 13 of the conventional voltage conversion circuit 11 shown in FIG. 17, the capacitor 17 is charged by the reactor 14 during only a very short period immediately after the switching element 15 is turned off, thereby to boost the output voltage of the rectifier circuit 20.

In brief, in the conventional voltage conversion circuit 11, boosting by the booster circuit 13 is carried out in a very short period just after a turn-off of the switching element 15, of the switching cycle of the booster circuit 13. On the other hand, in the converter circuit 100a of the fifth embodiment, boosting of the output voltage of the rectifier circuit 20 is substantially carried out over the entire switching cycle. To be specific, in the switch circuit 40 of the fifth embodiment, during a period when the switching element 45 is on while the switching element 46 is off, the output voltage of the AC power supply 1 is applied to the capacitor 32 between the two capacitors 31 and 32 connected in series. On the other hand, during a period when the switching element 45 is off while the switching element 46 is on, the output voltage of the AC power supply 1 is applied to the capacitor 31 between the two capacitors 31 and 32 connected in series. As described above, in this fifth embodiment, the boosting operation of applying the output voltage of the AC power supply 1 to the respective capacitors by the switch circuit 40 is carried out with higher efficiency as compared with the conventional voltage conversion circuit 11.

Since the capacitances of the two capacitors 31 and 32 of the converter circuit 100a are merely employed in one example of use of the motor driving apparatus 200, the capacitors may have different capacitances when the carrier frequency of the switch circuit 40 and the motor load are different from those mentioned above. The higher the carrier frequency is or the smaller the motor load is, the smaller the capacitances of the capacitors 31 and 32 are.

As described above, the motor driving apparatus 200 according to the fifth embodiment is provided with the converter circuit 100a which includes the rectifier circuit 20 for rectifying the output voltage of the AC power supply 1, and the two capacitors 31 and 32 connected in series for smoothing the output of the rectifier circuit 20, wherein the output voltage of the AC power supply 1 is applied alternately to the first and second capacitors 31 and 32 at a cycle that is shorter than the cycle of the AC power supply 1, and the output of the converter circuit is converted into a three-phase AC voltage and applied to the motor 2. Therefore, as in the first embodiment, the number of charging times per unit time for the capacitors 31 and 32 connected in series becomes larger than the frequency of the AC power supply 1, whereby the capacitances of the capacitors 31 and 32 can be reduced as compared with the case where both the capacitors are alternately charged for every polarity inversion of the AC power supply 1. As a result, the size of the motor driving apparatus equipped with the converter circuit 100a can be reduced.

While in this fifth embodiment the first and second switching elements 45 and 46 are complementarily turned on and off in the converter circuit 100a, the converter circuit 100a may have a period during which both of the first and second switching elements 45 and 46 are turned off.

Furthermore, in this fifth embodiment, the capacitances of the capacitors 31 and 32 of the converter circuit 100a are set at a value that is larger than a threshold value at which the terminal voltage of the capacitor drops to zero when the output of the motor 2 is maximum, under the condition that the carrier cycle of the switch circuit is fixed to a constant cycle that is smaller than the cycle of the output voltage of the AC power supply. However, if the capacitances of the capacitors 31 and 32 cannot be set at a value that is equal to or larger than the threshold value, the carrier cycle of the switch circuit 40 may be adjusted so that the voltages of the capacitors 31 and 32 are not lowered to zero when the output of the motor 2 is maximum, under the state where the capacitances of the capacitors 31 and 32 are set at a possible largest value that is smaller than the threshold value. Also, in this case, the boosting operation of the converter circuit 100a can be ensured in the whole driving area of the motor 2.

Further, in the converter circuit 100a of the fifth embodiment, the first and second switching elements 45 and 46 continuously perform switching operations while the motor 2 is being driven. However, the first and second switching elements 45 and 46 may stop the switching operations when the torque of the motor 2 satisfies a required value and a voltage whose amplitude is equal to or larger than the amplitude of the input voltage, i.e., the output voltage of the AC power supply 1, is not needed as the output of the converter circuit 100a, for example, when the load on the motor 2 is light or the rpm of the motor 2 is low.

In this case, in a low load area where boosting of the input voltage is not required, a boosting operation of the converter circuit 100a is stopped and only the full-wave rectifier circuit 20 is operated, whereby the operation efficiency of the converter circuit can be improved. That is, power loss in the converter circuit can be reduced by avoiding that useless current flows in the first and second switching elements 45 and 46 and the first to fourth diodes 21 to 24.

Whether or not the torque of the motor 2 satisfies a required torque can be judged from the power supplied to the motor 2. To be specific, a constant reference power is set with respect to the power supplied to the motor and, when the power supplied to the motor 21 is equal to or larger than the constant reference voltage, it is judged that a power equal to or larger than the reference voltage cannot be supplied to the motor without boosting the converter circuit 100a, and boosting of the converter circuit 100a is started. In this case, excess and deficiency of the torque of the motor can be easily estimated, and a switch circuit that operates according to the motor torque can be easily realized.

The reference voltage to be used for judgement as to whether or not boosting of the converter circuit 100a is required may be set so that a hysteresis of variations in the supply voltage is reflected in the judgement. That is, a first reference voltage for starting boosting and a second reference voltage for stopping boosting are used, and the first reference voltage is set to be larger than the second reference voltage. Thereby, it is possible to make the converter circuit 100a perform a stable operation.

Further, the voltage supplied to the motor 2 can be detected from the state of the load connected to the motor 2. However, the supply voltage to the motor 2 may be detected from the voltage and current inputted to the motor 2, or the voltage and current inputted to the inverter circuit 50, or the voltage and current inputted to the converter circuit 100a.

Further, in order to judge whether or not the torque of the motor 2 satisfies a required torque, a difference between a command rpm to the motor 2 and the actual rpm may be used. In this method, when control of the inverter circuit 50 is carried out to adjust the amplitude of the current or voltage to be supplied to the motor so that a difference between the required rpm and the actual rpm of the motor 2 is minimized, since the amplitude of the output voltage of the inverter circuit 50 peaks out if the motor is short of torque, a difference between the command rpm and the actual rpm increases, and the difference is never reduced. In this case, excess and deficiency of the torque of the motor can be accurately detected, whereby the switch circuit can be correctly operated according to the motor torque.

Furthermore, whether or not the torque of the motor 2 satisfies a required torque may be judged from the amplitude of the current supplied to the motor 2. In this case, when a permanent magnet motor or the like is employed as the motor 2, the inverter circuit 50 sends a current to the motor 2 to cancel the magnetic flux if the input voltage to the inverter circuit 50 is insufficient, thereby to output torque. More specifically, when the amount of current supplied to the motor 2 is equal to or larger than a constant reference current, the converter circuit 100a starts boosting. In this case, a switch circuit that operates according to the motor torque can be easily realized.

Further, the reference current to be used for judging whether or not boosting of the converter circuit 100a should be carried out may be set so that a hysteresis of variations in the supply voltage is reflected in the judgement. That is, a first reference current for starting boosting and a second reference current for stopping boosting are employed, and the first reference current is set to be larger than the second reference current. Thereby, it is possible to make the converter circuit 100a perform a more stable operation.

Sixth Embodiment

Figure 6:
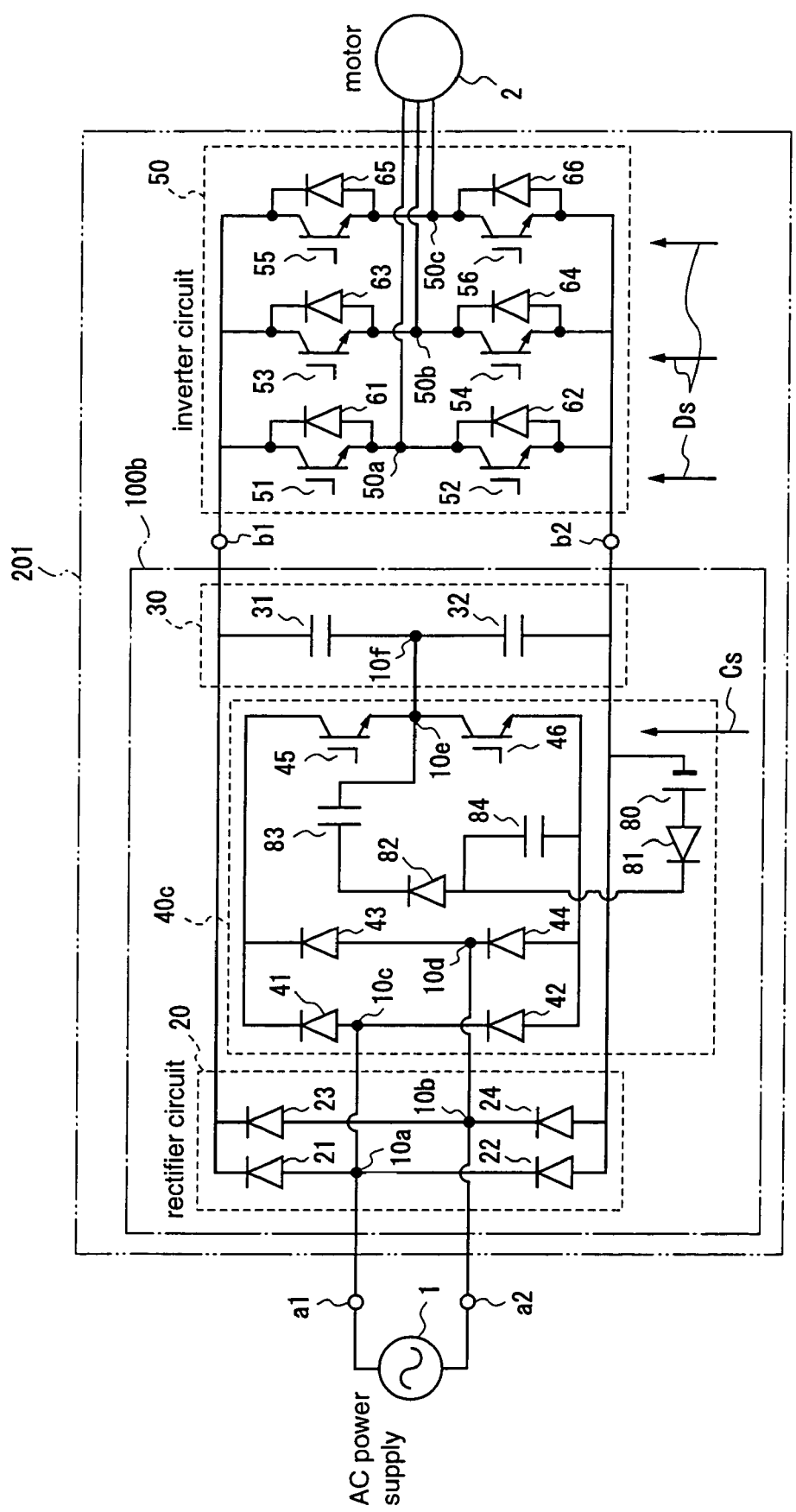
FIG. 6 is a diagram for explaining a converter circuit according to a sixth embodiment of the present invention.

FIG. 6 is a diagram for explaining a motor driving apparatus according to a sixth embodiment of the present invention.

The motor driving apparatus 201 is provided with a converter circuit 100b that shares a driving power supply with the inverter circuit 50, instead of the converter circuit 100a of the motor driving apparatus 200 of the fifth embodiment.

That is, the inverter circuit 50 of the motor driving apparatus 201 is identical to that of the fifth embodiment. The converter circuit 100b includes, like the converter circuit 100a of the fifth embodiment, a rectifier circuit 20 for rectifying the output voltage of the AC power supply 1, a capacitor circuit 30 for smoothing the output of the rectifier circuit 20, and a switch circuit 40c for alternately charging capacitors 31 and 32, which are components of the capacitor circuit 30 and which are connected in series, with the output voltage of the AC power supply 1.

The switch circuit 40c includes, in addition to the elements 41 to 46 constituting the switch circuit 40a of the fifth embodiment, a diode 81 and a capacitor 84 which are connected in series between the plus terminal of the DC power supply 80 for driving the switching elements 51 to 56 of the inverter circuit 50, and the emitter of the second switching element 46; and a diode 82 and a capacitor 83 which are connected in series between the connection node of the elements 81 and 84 and the connection node of the first and second switching elements 45 and 46.

A power supply circuit for driving the second switching element 46 comprises the driving power supply 80 of the inverter circuit 50, the diode 81 having a cathode connected to the plus terminal of the power supply 80, and the capacitor 84 connected between the anode of the diode 81 and the emitter of the second switching element 46. Further, a power supply circuit for driving the first switching element 45 comprises the power supply circuit for driving the second switching element 46, the diode 82 having a cathode connected to the anode of the diode 81, and the capacitor 83 connected between the anode of the diode 82 and the connection node 10e of the switching elements 45 and 46.

Next, the operation of the motor driving apparatus 201 will be described.

In the motor driving apparatus 201 according to the sixth embodiment, the fundamental operation of the converter circuit 100b is identical to that of the converter circuit 100a according to the fifth embodiment, and the inverter circuit 50 operates in the same manner as described for the fifth embodiment.

Therefore, only the operation of the power supply circuit for driving the first switching element 45 of the converter circuit 100b and the operation of the power supply circuit for driving the second switching element 46 will be described hereinafter.

When the voltage at the connection node of the emitter of the second switching element 46 and the anodes of the second and fourth diodes 42 and 44 becomes equal to the voltage at the output terminal b2 of the converter circuit 100b, a current flows from the driving power supply 80 of the inverter circuit 50 through the diode 81 to the capacitor 84, whereby the capacitor 84 is charged. The second switching element 46 is driven by a terminal voltage that is generated by the charging of the capacitor 84. That is, the terminal voltage of the capacitor 84 is applied between the gate and emitter of the switching element 46 according to the open-close control signal Cs.

On the other hand, when the voltage at the connection node 10e of the first and second switching elements 45 and 46 becomes equal to the voltage at the output terminal b2 of the converter circuit 100b, a current flows from the driving power supply 80 of the inverter circuit 50 through the diodes 81 and 82 to the capacitor 83, whereby the capacitor 83 is charged. When the second switching element 46 is turned on and both the ends thereof are at the same voltage, a current flows from the capacitor 84 through the diode 82 to the capacitor 83, whereby the capacitor 83 is charged. The first switching element 45 is driven by a terminal voltage that is generated by the charging of the capacitor 83. That is, the terminal voltage of the capacitor 83 is applied between the gate and emitter of the switching element 45 according to the open-close control signal Cs.

As described above, according to the sixth embodiment, FET elements or the like which are able to perform electrical switching are used as the first and second switching elements 45 and 46, and the driving power supply for the switching elements 45 and 46 is created from the power supply for driving the inverter circuit 50. Therefore, it becomes unnecessary to specially prepare a power supply for driving the first and second switching elements 45 and 46, whereby the number of circuit components can be significantly reduced, resulting in reductions in circuit space and cost.

While in the fifth and sixth embodiments the carrier cycle for turning on and off the first and second switching elements 45 and 46 is constant, the carrier cycle may be varied according to the load on the motor 2. That is, when the motor load is not so heavy, the switching loss can be reduced by increasing the carrier cycle. At this time, the carrier cycle is not necessarily varied linearly, but several cycles may be changed in stages.

Further, the carrier cycle for turning the first and second switching elements 45 and 46 on and off may be equal to the carrier cycle for turning switching of the inverter circuit 50 on and off. Thereby, the frequency of the harmonic current generated by the motor driving apparatus 200 is unified, and the number of noise filters to be provided at the input side is reduced to one, resulting in significant reduction in cost.

Furthermore, the first and second switching elements 45 and 46 may perform switching so as to reduce the harmonic component of the current inputted to the converter circuit 100b. To be specific, the switching elements 45 and 46 may perform switching by adjusting the phase obtained from the timing of switching of the inverter circuit 50. The harmonic current that appears at the input side of the converter circuit 100b is detected, and the first and second switching elements 45 and 46 may perform switching so as to cancel the harmonic current.

Thereby, the harmonic current is reduced, and the size of the noise filter to be provided at the input side can be reduced, or the noise filter can be dispensed with.

Further, the diode as a component of the rectifier circuit 20 of the converter circuit 100b may be implemented by an element having an inverse recovery time as short as that of the diode as a component of the converter circuit 100b. In this case, it is possible to reduce the loss at commutation in the rectifier circuit 20 in which the current is cut off at every carrier cycle of the first and second switching elements 45 and 46, whereby efficiency of the circuit operation is enhanced.

Seventh Embodiment

Figure 7:
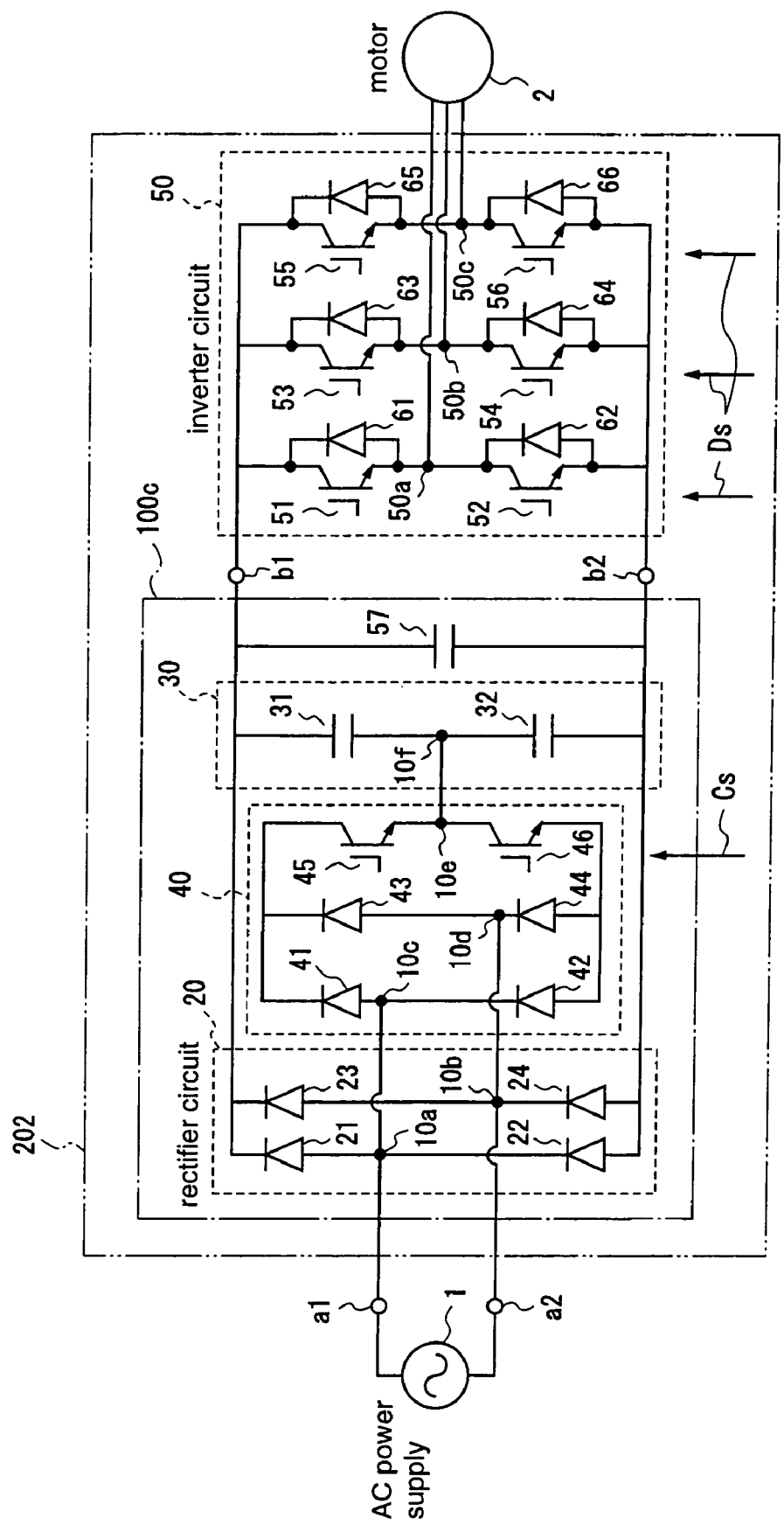
FIG. 7 is a diagram for explaining a converter circuit according to a seventh embodiment of the present invention.

FIG. 7 is a diagram for explaining a motor driving apparatus according to a seventh embodiment of the present invention.

The motor driving apparatus 202 according to the seventh embodiment is provided with a converter circuit 100b which is obtained by adding a capacitor 57 for charging a regenerative current from the motor 2 at the output side of the converter circuit 100a of the motor driving apparatus 200 of the fifth embodiment. The components of the motor driving apparatus 202 other than the converter circuit 100c are identical to those of the motor driving apparatus 200 of the fifth embodiment.

To be specific, the converter circuit 100c includes, like the converter circuit 100a of the fifth embodiment, a rectifier circuit 20 for rectifying the output voltage of the AC power supply 1, a capacitor circuit 30 for smoothing the output of the rectifier circuit 20, and a switch circuit 40 for alternately charging two capacitors 31 and 32 which are components of the capacitor circuit 30 and are connected in series. In the converter circuit 100c, the capacitor 57 is connected in parallel to the two capacitors 31 and 32 connected in series, between the output terminals b1 and b2 of the converter circuit 100c.

The capacitance of the capacitor 57 may be set to a value at which the inverter circuit is prevented from being damaged by the motor regenerative current. For example, when the motor driving apparatus is one for controlling a motor of a compressor that is used in a home-use air conditioner, the capacitance of the capacitor 57 is about 1 µF to 50 µF. This capacitance is a minimum threshold value which is obtained from the capacitance of the inductance of the motor, the maximum variation allowed for the inverter input voltage, and the maximum value of the current applied to the motor.

That is, the energy possessed by the motor when the maximum current is applied to the motor can be obtained from the capacitance of the inductance. Then, the capacitance of the capacitor is determined on the basis of the extent to which an increase in the terminal voltage of the capacitor, which occurs when the energy is applied to the capacitor as a motor regenerative current, is allowed.

Next, the operation of the motor driving apparatus 202 will be described.

In the motor driving apparatus 202 according to the seventh embodiment, since the rectifier circuit 20, the capacitor circuit 30, the switch circuit 40, and the inverter circuit 50 are operated in the same manner as described for the fifth embodiment, only the operation which is different from those mentioned for the fifth embodiment will be described hereinafter.

When the motor 2 is stopped or the switching operation of the inverter circuit 50 is stopped, the current that flows in the motor 2 is regenerated at the input end of the inverter circuit 50. When this regenerative current is large, the voltage at the input end of the inverter circuit 50 becomes excessively large, whereby the motor driving apparatus, especially the inverter circuit 50, might be damaged.

In the motor driving apparatus 202 according to the seventh embodiment, however, since the capacitor 57 is added at the output end of the converter circuit 100c as shown in FIG. 7, the regenerative current from the motor 2 is charged to the capacitor 57 when the motor 2 is stopped, thereby minimizing increase in the voltage at the input end of the inverter circuit 50 due to the regenerative current.

Thereby, the elements of the inverter circuit 50 are prevented from being destroyed by the motor regenerative current that occurs when the motor is stopped, resulting in a more safe motor driving apparatus.

As described above, the motor driving apparatus 202 of the seventh embodiment is provided with the converter circuit 100c having the capacitor 57, which is added between the output terminals b1 and b2 and which charges the regenerative current from the motor 2, in addition to the rectifier circuit 20, the switch circuit 40, and the capacitor circuit 30 which constitute the converter circuit 100a of the fifth embodiment. Therefore, in addition to the effects of the fifth embodiment, the elements of the inverter circuit 50 are prevented from being destroyed by the regenerative current even when the motor 2 is suddenly stopped, whereby reliability of the motor driving apparatus is improved.

The switch circuit comprising the first to fourth diodes 41 to 44 and the first and second switching elements 45 and 46, which swift circuit is included in the converter circuit according to any of the fifth to seventh embodiments, may be modularized. In this case, the motor driving apparatus that does not need boosting can be implemented by only removing the module. In other words, the circuit substrate can be shared by the motor driving apparatus that does not need boosting of the power supply voltage and the motor driving apparatus that needs boosting of the power supply voltage, resulting in an improved design efficiency.

Further, the modularized switch circuit may be supplied with a driving signal from the driving unit of the inverter circuit 50. In this case, a driving unit for driving the module as the switch circuit is dispensed with, resulting in a reduction in cost of the motor driving apparatus.

Eighth Embodiment

Figure 8:
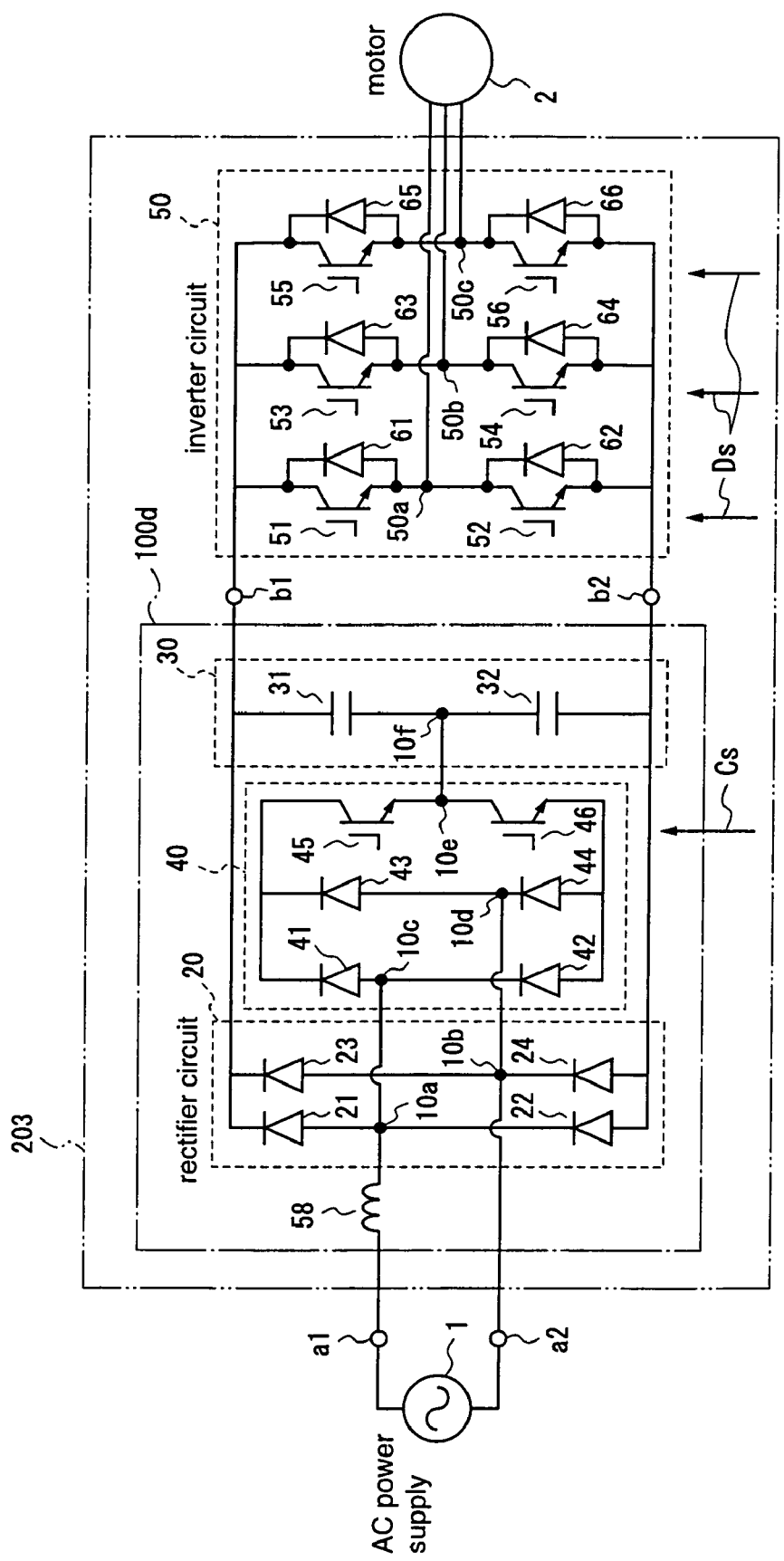
FIG. 8 is a diagram for explaining a converter circuit according to an eighth embodiment of the present invention.

FIG. 8 is a diagram for explaining a motor driving apparatus according to an eighth embodiment of the present invention.

The motor driving apparatus 203 according to the eighth embodiment is provided with a converter circuit 100d which is obtained by adding a reactor 58 to the input end of the converter circuit 100a of the motor driving apparatus 200 according to the fifth embodiment. The components of the motor driving apparatus 203 other than the converter circuit 100d are identical to those of the motor driving apparatus 200 of the fifth embodiment.

To be specific, the converter circuit 100d includes, like the converter circuit 100a of the fifth embodiment, a rectifier circuit 20 for rectifying the output voltage of the AC power supply 1, a capacitor circuit 30 for smoothing the output of the rectifier circuit 20, and a switch circuit 40 for alternately charging two capacitors 31 and 32 which are components of the capacitor circuit 30 and are connected in series. The converter circuit 100d includes the reactor 58 which is connected between the connection node 10a of the rectifier circuit 20 and the input terminal a1 to which the output of the AC power supply 1 is applied.

The capacitance of the reactor 58 may be set to a value at which switching current noise that occurs with the switching operation of the inverter circuit is removed, and the waveform of the output current of the AC power supply is not distorted. For example, when the motor driving apparatus is one for driving a motor of a compressor that is used in a home-use air conditioner, the capacitance of the reactor 58 is about 0.1 mH to 1.0 mH. This value depends on the carrier frequency of the converter circuit 100d, i.e., the on-off repetition cycle of the switching element, and is determined so as to reduce harmonics of the carrier component.

Next, the operation of the motor driving apparatus 203 will be described.

In the motor driving apparatus 203 according to the eighth embodiment, the rectifier circuit 20, the capacitor circuit 30, the switch circuit 40, and the inverter circuit 50 are operated in the same manner as described for the fifth embodiment, and therefore, only the operation which is different from those mentioned for the fifth embodiment will be described hereinafter.

The output current of the AC power supply 1 is influenced by the switching operation of the converter circuit 100d, and the switching current is superposed as noise.

In the motor driving apparatus 203, as shown in FIG. 8, the noise generated in the converter circuit 100d is cut off by the reactor 58 that is inserted between the AC power supply 1 and the converter circuit 100d, whereby the switching noise superposed on the output current of the AC power supply 1 is reduced. Thereby, the waveform of the output current of the AC power supply 1 is prevented from being distorted, and the power factor of the input current is improved.

As described above, the motor driving apparatus 203 according to the eighth embodiment is provided with the converter circuit 100d including the reactor 58 which is inserted between the input end of the rectifier circuit 20 and the AC power supply 1, and cuts off the noise generated in the switch circuit 40, in addition to the rectifier circuit 20, the switch circuit 40, and the capacitor circuit 30 which constitute the converter circuit 100a of the fifth embodiment. Therefore, in addition to the effects of the fifth embodiment, the switching noise superposed on the output of the AC power supply 1 can be reduced, thereby increasing the power factor of the input current, and suppressing occurrence of harmonic current.

While in this eighth embodiment the switching elements 45 and 46, which are components of the switch circuit 40 of the converter circuit 100d, complementary perform an on-off operation, the on periods of the first and second switching elements 45 and 46 may be slightly overlapped. In this case, the output voltage of the converter circuit can be boosted to a voltage that is twice or more than the power supply voltage, whereby a motor that needs a voltage that is twice or more than the power supply voltage can also be driven.

Further, in the motor driving apparatus of the eighth embodiment, the inverter circuit 50 is controlled so that a driving current having a frequency according to the rpm of the motor is applied to the motor. However, the motor driving apparatus may control the current supplied from the inverter circuit 50 to the motor 2 so as to improve the power factor of the current inputted to the converter circuit 100d. Thereby, the power factor of the input current to the converter circuit 100d is improved, and the harmonic current is reduced. Further, the motor driving apparatus of the eighth embodiment may control on-off of the first and second switching elements 45 and 46 so as to improve the power factor of the current inputted to the converter circuit 100d. Thereby, the power factor of the input current can be improved, and the harmonic current can be reduced.

The motor driving apparatus according to the eighth embodiment may be provided with the switch circuit 40a of the converter circuit 101 according to the second embodiment, instead of the switch circuit 40 as a component of the converter circuit 100d. Also in this case, the same effects as described for the eighth embodiment can be achieved.

Furthermore, the motor driving apparatus according to the seventh embodiment is provided with the capacitor at the input end of the converter circuit, and the motor driving apparatus according to the eighth embodiment is provided with the reactor between the converter circuit and the AC power supply. However, the motor driving apparatus may be provided with both of the capacitor and the reactor.

Ninth Embodiment

Figure 9:
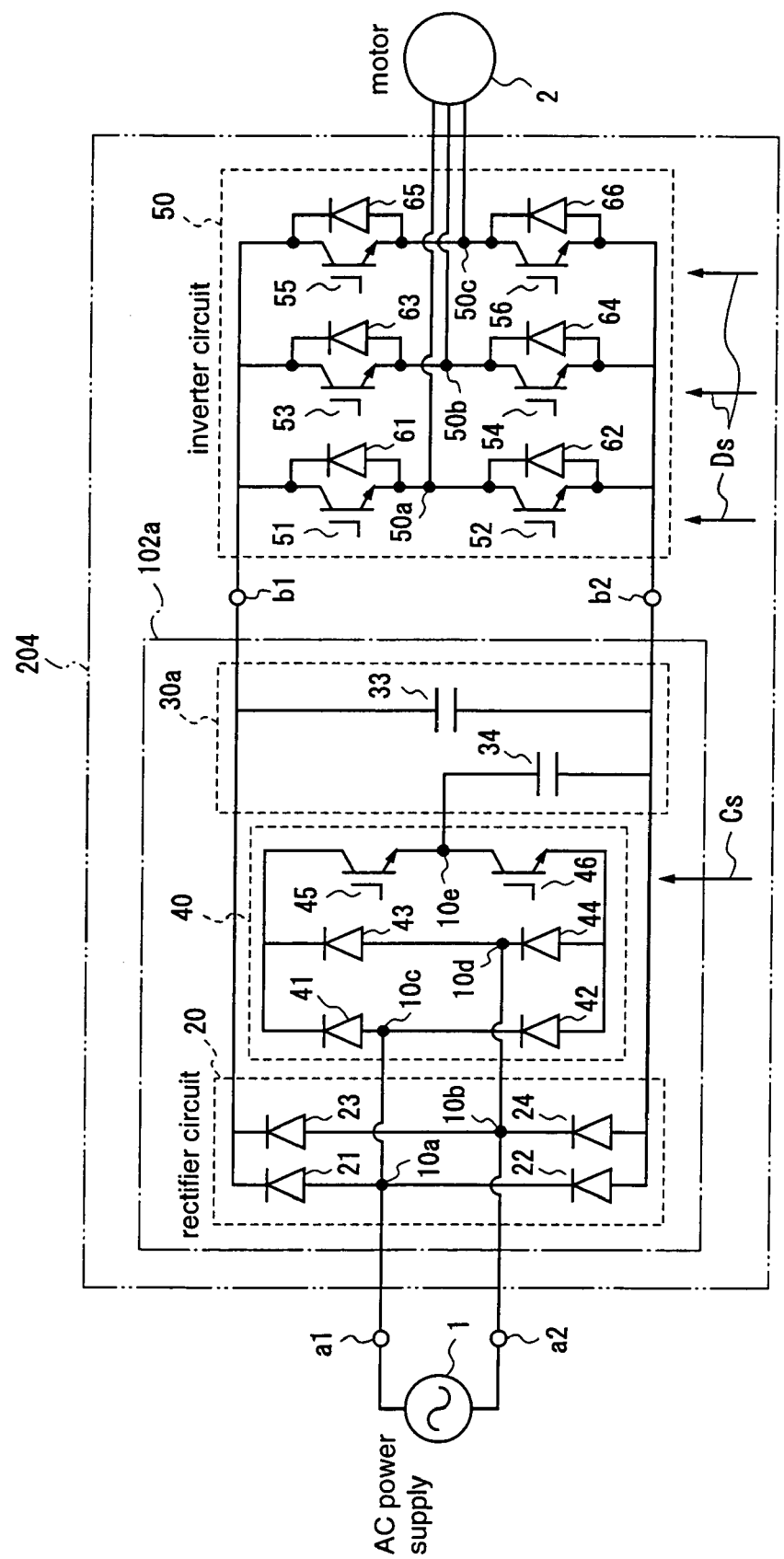
FIG. 9 is a diagram for explaining a motor driving apparatus according to a ninth embodiment of the present invention.

FIG. 9 is a motor driving apparatus according to a ninth embodiment of the present invention.

The motor driving apparatus 204 according to the ninth embodiment receives a voltage supplied from the AC power supply 1, and drives the motor 2. The motor driving apparatus 204 includes a converter circuit 102a that is able to output a non-negative voltage having an amplitude equal to or larger than the amplitude of the input voltage, and an inverter circuit 50 that converts the non-negative voltage outputted from the circuit into a three-phase AC voltage to be applied to the motor 2.

The converter circuit 102a is identical to the converter circuit 102 according to the third embodiment. That is, the converter circuit 102a includes a rectifier circuit 20 for rectifying the output voltage of the AC power supply 1, a third capacitor 33 connected between the output ends b1 and b2, a fourth capacitor 34 having an end connected to the output terminal b2, and a switch circuit 40 which connects the other end 10e of the fourth capacitor 34 alternately to the input terminals a1 and a2 which are connected to the AC power supply so that charging of the third capacitor 33 and charging of the fourth capacitor 34 are alternately repeated at a cycle that is shorter than the cycle of the output voltage of the AC power supply 1. In the switch circuit 40 of the converter circuit 102a, the respective switching elements 45 and 46 are turned on and off according to an open-close control signal Cs as in the third embodiment. Accordingly, also in the converter circuit 102a of the motor driving apparatus 204 according to the ninth embodiment, as in the third embodiment, by turning the switching elements 45 and 46 on and off, the output voltage of the AC power supply 1 is applied to the fourth capacitor 34 while a sum voltage of the terminal voltage of the fourth capacitor 34 and the output voltage of AC power supply 1 is applied to the third capacitor 33, at a cycle that is shorter than the cycle of the AC power supply 1.

Further, in the motor driving apparatus 204 according to the ninth embodiment, only one capacitor 33 that is a component of the capacitor circuit 30a is connected between the output terminals b1 and b2 of the converter circuit 102a. Accordingly, in the converter circuit 102a, the capacitances of the capacitors 33 and 34 which are components of the capacitor circuit 30a are further reduced as compared with those in the circuit structure in which plural capacitors are connected in series between the output terminals b1 and b2. For example, in the motor driving apparatus 204, when the carrier frequency of the switch circuit 40 is set at 10 kHz and the motor is driven with a motor load corresponding to a motor driving current of about 15 A as in the fifth embodiment, the capacitance required of the third capacitor 33 of the capacitor circuit 30a is about 2 µF, and the capacitance required of the fourth capacitor 34 of the capacitor circuit 30 is about 1 µF.

The inverter circuit 50 is identical to the inverter circuit 50 according to the fifth embodiment.

As described above, the motor driving apparatus 204 according to the ninth embodiment is provided with the converter circuit 102a that is identical to the converter circuit 102 according to the third embodiment, instead of the converter circuit 100a of the motor driving apparatus 200 according to the fifth embodiment. Therefore, as in the third embodiment, the number of charging per unit time of the capacitors 33 and 34 becomes larger than the frequency of polarity inversion of the AC power supply, and the capacitances of the capacitors 33 and 34 can be reduced as compared with the case where the both capacitors are alternately charged for every polarity inversion of the AC power supply 1, whereby the size of the motor driving apparatus equipped with the converter circuit can be reduced.

While in this ninth embodiment the converter circuit 102a is identical to the converter circuit 102 according to the third embodiment, the converter circuit 102a may be identical to the converter circuit 103 according to the fourth embodiment. Also, in this case, the same effects as those of the motor driving apparatus according to the ninth embodiment can be achieved.

Further, the motor driving apparatus according to the ninth embodiment is not restricted to that mentioned above. The motor driving apparatus according to the ninth embodiment may be provided with a capacitor for charging a regenerative current from the motor, at the output end of the converter circuit 102a, like the motor driving apparatus 202 of the seventh embodiment, or the motor driving apparatus may be provided with a reactor at the input end of the converter circuit 102a, like the motor driving apparatus 203 according to the eighth embodiment.

Tenth Embodiment

Figure 10:
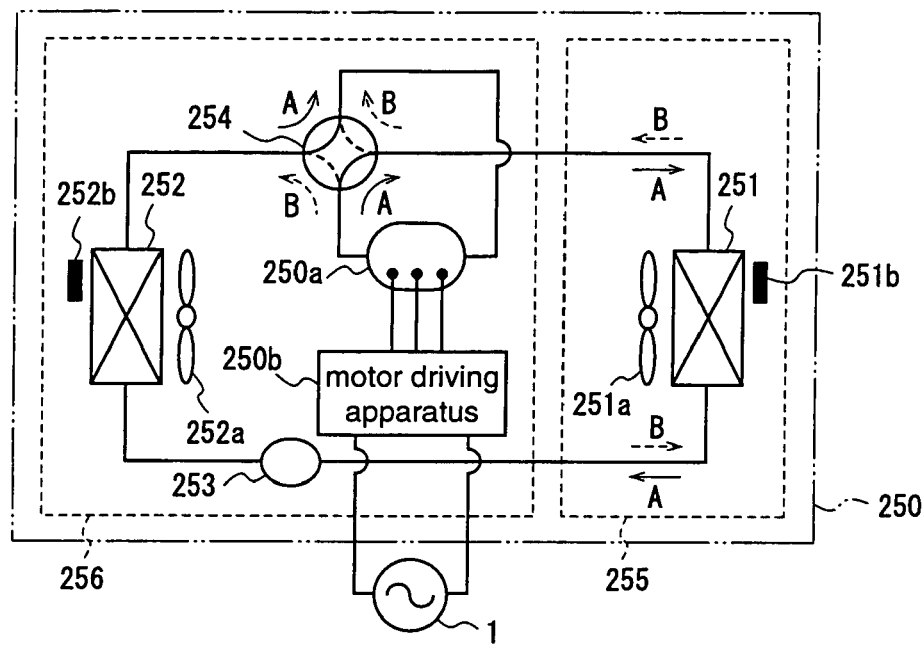
FIG. 10 is a schematic diagram for explaining an air conditioner according to a tenth embodiment of the present invention.

FIG. 10 is a block diagram for explaining an air conditioner according to a tenth embodiment of the present invention.

An air conditioner 250 according to the tenth embodiment has an indoor unit 255 and an outdoor unit 256, and performs cooling and heating.

The air conditioner 250 is provided with a compressor 250a for circulating a refrigerant between the indoor unit 255 and the outdoor unit 256, and a motor driving unit 250b for driving a motor (not shown) of the compressor 250a with a voltage supplied from an AC power supply 1. In FIG. 10, the AC power supply 1, the motor of the compressor 250a, and a motor driving apparatus 250b are identical to the AC power supply 1, the motor 2, and the motor driving apparatus 200 according to the fifth embodiment, respectively.

Further, the air conditioner 250 has a four-way valve 254, a throttle 253, an indoor heat exchanger 251, and an outdoor heat exchanger 252. The indoor heat exchanger 251 is a component of the indoor unit 255, while the throttle 253, the outdoor heat exchanger 252, the compressor 250a, the four-way valve 254, and the motor driving apparatus 250b are components of the outdoor unit 256.

The indoor heat exchanger 251 has an air blower 251a for increasing the efficiency of heat exchange, and a temperature sensor 251b for measuring the temperature of the heat exchanger 251 or the ambient temperature thereof. The outdoor heat exchanger 252 has an air blower 252a for increasing the efficiency of heat exchange, and a temperature sensor 252b for measuring the temperature of the heat exchanger 252 or the ambient temperature thereof.

In this tenth embodiment, the compressor 250a and the four-way valve 254 are placed in the refrigerant path between the indoor heat exchanger 251 and the outdoor heat exchanger 252. That is, in this air conditioner 250, the four-way valve 254 selects either of the following two states: the state where the refrigerant flows in the direction of arrow A, the refrigerant that has passed through the outdoor heat exchanger 252 is sucked into the linear compressor 250a, and the refrigerant discharged from the linear compressor 250a is supplied to the indoor heat exchanger 251; and the state where the refrigerant flows in the direction of arrow B, the refrigerant that has passed through the indoor heat exchanger 251 is sucked into the linear compressor 250a, and the refrigerant discharged from the linear compressor 250a is supplied to the outdoor heat exchanger 252.

Further, the throttle 253 has both the function of reducing the flow rate of the circulating refrigerant, and the function as a valve for automatically controlling the flow rate of the refrigerant. That is, under the state where the refrigerant is circulating in the refrigerant circulation path, the throttle 253 reduces the flow rate of the fluid refrigerant outputted from the condenser to the evaporator to expand the fluid refrigerant, and supplies a proper amount of refrigerant that is required for the evaporator.

The indoor heat exchanger 251 operates as the condenser during heating, and as the evaporator during cooling. The outdoor heat exchanger 252 operates as the evaporator during heating, and as the condenser during cooling. In the condenser, the high-temperature and high-pressure refrigerant gradually liquefies while losing heat to the air that is blown into the condenser, resulting in a high-pressure fluid refrigerant in the vicinity of the outlet of the condenser. This is equivalent to where the refrigerant liquefies while radiating heat into the air. Further, the fluid refrigerant whose temperature and pressure are reduced by the throttle 253 flows into the evaporator. When the indoor air is blown into the evaporator under this state, the fluid refrigerant takes a great amount of heat from the air and evaporates, resulting in a low-temperature and low-pressure gas refrigerant. The air which has lost a great amount of heat in the evaporator is discharged as cool air from the blowoff port of the air conditioner.

Next, the operation of the air conditioner 250 will be described.

In the air conditioner 250, when an output voltage of the AC power supply 1 is applied to the motor driving apparatus 250b, the output voltage of the AC power supply 1 is rectified and boosted by the converter circuit as in the motor driving apparatus 200 of the fifth embodiment, and further, the output of the converter circuit 100a is converted into a three-phase motor driving voltage by the inverter circuit 50 (refer to FIG. 5).

When the three-phase motor driving voltage is applied to a motor (not shown) of the compressor 250a, the compressor 250a is driven and thereby the refrigerant circulates in the refrigerant circulation path, and heat exchange is carried out in the heat exchanger 251 of the indoor unit 255 and the heat exchanger 252 of the outdoor unit 256. That is, in the air conditioner 250, a well-known heat pump cycle is created in the refrigerant circulation path by circulating the refrigerant that is sealed in the circulation path, by using the compressor 250a. Thereby, heating or cooling is carried out.

For example, when the air conditioner 250 performs heating, the four-way valve 254 is set by a user operation so that the refrigerant flows in the direction of arrow A. In this case, the indoor heat exchanger 251 operates as a condenser, and discharges heat by circulation of the refrigerant in the refrigerant circulation path. Thereby, the room is heated.

Conversely, when the air conditioner 250 performs cooling, the four-way valve 254 is set by a user operation so that the refrigerant flows in the direction of arrow B. In this case, the indoor heat exchanger 251 operates as an evaporator, and absorbs heat from the ambient air by circulation of the refrigerant in the refrigerant circulation path. Thereby, the room is cooled.

In the air conditioner 250, a command rpm is determined on the basis of the target temperature that is set on the air conditioner 250, the actual room temperature and outdoor temperature, and the motor driving apparatus 250b controls the rpm of the motor of the compressor 250a on the basis of the command rpm. Thereby, comfortable cooling or heating is carried out by the air conditioner 250.

As described above, in the air conditioner 250 according to the tenth embodiment, the motor driving apparatus 250b for driving the motor as a power source of the compressor 250a is provided with the converter circuit which includes the rectifier circuit for rectifying the output voltage of the AC power supply, and two capacitors connected in series for smoothing the output of the rectifier circuit. Further, the motor driving apparatus 250b applies the output voltage of the AC power supply 1 to both the capacitors alternately at a cycle that is shorter than the cycle of the output voltage of the AC power supply 1. The output voltage of the converter circuit is converted into a three-phase AC voltage to be applied to the motor of the compressor 250a. Therefore, as in the fifth embodiment, the capacitances of the capacitors constituting the converter circuit can be reduced, whereby the motor driving apparatus 250b equipped with the converter circuit can be reduced in size and price, leading to reductions in size and price of the air conditioner 250.

Eleventh Embodiment

Figure 11:
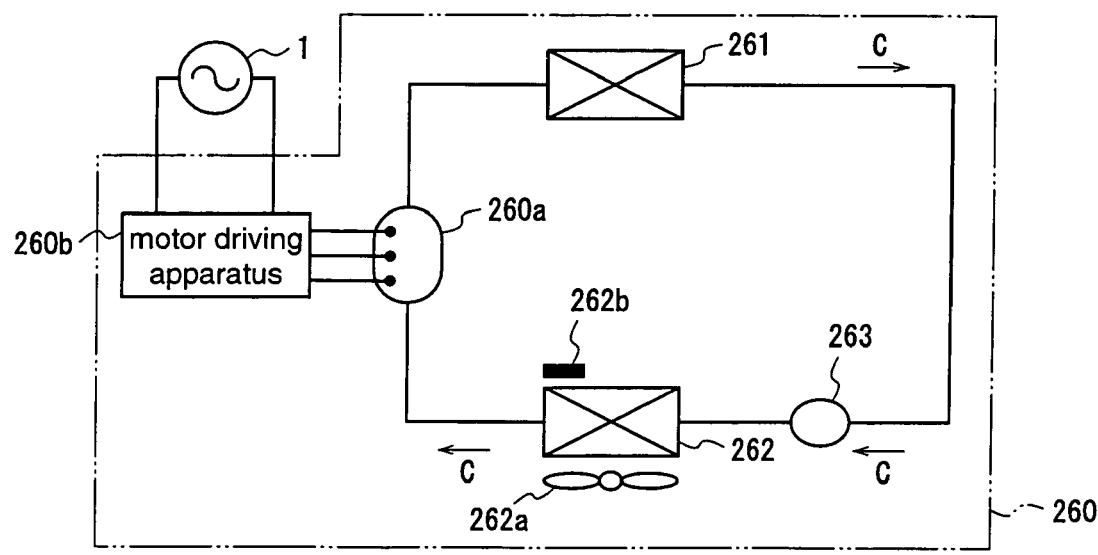
FIG. 11 is a schematic diagram for explaining a refrigerator according to an eleventh embodiment of the present invention.

FIG. 11 is a block diagram for explaining a refrigerator according to an eleventh embodiment of the present invention.

A refrigerator 260 according to this eleventh embodiment comprises a compressor 260a, a motor driving apparatus 260b, a condenser 261, an evaporator 262, and a throttle 263.

The compressor 260a, the condenser 261, the throttle 263, and the evaporator 262 form a refrigerant circulation path. The motor driving apparatus 260b has an input connected to an AC power supply 1, and drives a motor (not shown) as a drive source of the compressor 260a. The power supply 1, the motor of the compressor 260a, and the motor driving apparatus 260b are identical to AC the power supply 1, the motor 2, and the motor driving apparatus 200 according to the fifth embodiment, respectively.

The throttle 263 reduces the flow rate of the fluid refrigerant outputted from the condenser 261 to expand the fluid refrigerant under the state where the refrigerant is circulating in the refrigerant circulation path, and supplies a proper amount of refrigerant that is required for the evaporator 262, like the throttle 253 of the air conditioner 250 according to the tenth embodiment.

The condenser 261 condenses the high-temperature and high-pressure refrigerant gas that flows therein, and discharges the heat of the refrigerant to the outside air. The refrigerant gas sent into the condenser 261 gradually liquefies while losing heat to the outside air, resulting in a high-pressure fluid refrigerant in the vicinity of the outlet of the condenser.

The evaporator 262 evaporates the low-temperature fluid refrigerant to cool the inside of the refrigerator 260. The evaporator 262 has an air blower 262a for increasing efficiency of heat exchange, and a temperature sensor 262b for detecting the temperature inside the refrigerator.

Next, the operation of the refrigerator 260 will be described.

In the refrigerator 260 according to the eleventh embodiment, when an output voltage of the AC power supply 1 is input to the motor driving apparatus 260b, the output voltage of the AC power supply 1 is rectified and boosted by the converter circuit 100a as in the motor driving apparatus 200 according to the fifth embodiment, and further, the output of the converter circuit 100a is converted into a three-phase motor driving voltage by the inverter circuit 50 (refer to FIG. 5).

When the three-phase motor driving voltage is applied to a motor (not shown) of the compressor 260a, the compressor 260a is driven and thereby the refrigerant circulates in the direction of arrow C in the refrigerant circulation path, whereby heat exchange is carried out between the condenser 261 and the evaporator 262. Thus, the inside of the refrigerator 260 is cooled.

That is, the flow rate of the refrigerant, which is liquefied in the condenser 261, is reduced by the throttle 263, and thereby the refrigerant expands, resulting in a low-temperature fluid refrigerant. When the low-temperature fluid refrigerant is sent into the evaporator 262, it is evaporated in the evaporator 262, whereby the inside of the refrigerator 260 is cooled. At this time, the air in the refrigerator 260 is compulsorily sent into the evaporator 262 by the air blower 262a, and thereby heat exchange is efficiently carried out in the evaporator 262.

As described above, in the refrigerator 260 according to the eleventh embodiment, the motor driving apparatus 260b for driving the motor as a power source of the compressor 260a is provided with the converter circuit which includes the rectifier circuit for rectifying the output voltage of the AC power supply, and two capacitors connected in series for smoothing the output of the rectifier circuit. The motor driving apparatus 260, and applies the output voltage of the AC power supply 1 to both the capacitors alternately at a cycle that is shorter than the cycle of the output voltage of the AC power supply 1. The output voltage of the converter circuit is converted into a three-phase AC voltage to be applied to the motor of the compressor 260a. Therefore, as in the fifth embodiment, the capacitances of the capacitors constituting the converter circuit can be reduced, whereby the motor driving apparatus 260b equipped with the converter circuit can be reduced in size and price, leading to reductions in size and price of the refrigerator 260.

Twelfth Embodiment

Figure 12:
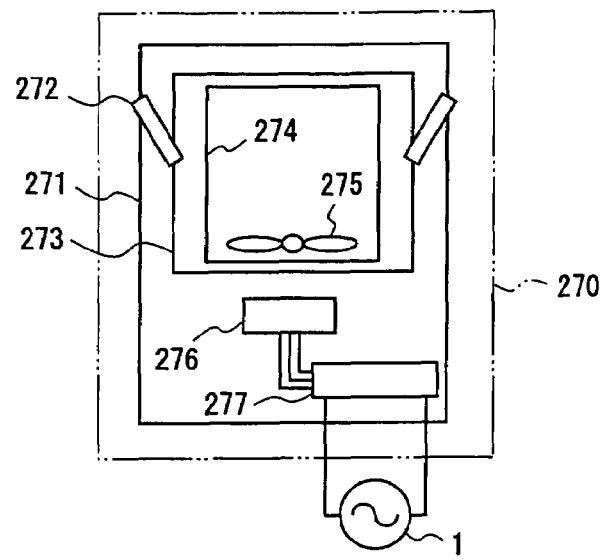
FIG. 12 is a schematic diagram for explaining an electric washing machine according to a twelfth embodiment of the present invention.

FIG. 12 is a block diagram for explaining an electric washing machine according to a twelfth embodiment of the present invention.

A washing machine 270 according to the twelfth embodiment has a washing machine outer frame 271, and an outer bath 273 is hung by a bar 272 in the outer frame 271. A washing/dewatering bath 274 is rotatably placed in the outer frame 273, and an agitation blade 275 is rotatably attached to the bottom of the washing/dewatering bath 274.

A motor 276 for rotating the washing/dewatering bath 274 and the agitation blade 275 are placed in a space beneath the outer bath 273 in the outer frame 271, and a motor driving apparatus 277 that is connected to an external AC power supply 1 and drives the motor 276 is attached to the outer frame 271.

The AC power supply 1, the motor 276, and the motor driving apparatus 277 are identical to the AC power supply 1, the motor 2, and the motor driving apparatus 200 according to the fifth embodiment, respectively. A command signal indicating a command rpm according to a user operation is input to the motor driving apparatus 277 from a microcomputer (not shown) that controls the operation of the washing machine 270.

Next, the operation of the washing machine 270 will be described.

In the washing machine 270, when the user performs a predetermined operation, a command signal is output from the microcomputer to the motor driving apparatus 277 that receives a voltage from the AC power supply 1. In the motor driving apparatus 277, the output voltage of the AC power supply 1 is rectified and boosted by the converter circuit 100a as in the motor driving apparatus 200 of the fifth embodiment, and further, the output voltage of the converter circuit 100a is converted into a three-phase motor driving voltage by the inverter circuit 50 (refer to FIG. 5).

When the three-phase motor driving voltage is applied to the motor 276, the agitation blade 275 or the washing/dewatering bath 274 is rotated by the motor 276, and washing or dewatering of laundry such as clothes in the bath 274 is carried out.

As described above, in the washing machine 270 according to the twelfth embodiment, the motor driving apparatus 277 for driving the motor 276 as a power source is provided with the converter circuit which includes the rectifier circuit for rectifying the output voltage of the AC power supply 1, and two capacitors connected in series for smoothing the output of the rectifier circuit. The motor driving apparatus 277 applies the output voltage of the AC power supply 1 to both the capacitors alternately at a cycle that is shorter than the cycle of the output voltage of the AC power supply 1. The output voltage of the converter circuit is converted into a three-phase AC voltage to be applied to the motor 276. Therefore, as in the fifth embodiment, the capacitances of the capacitors constituting the converter circuit can be reduced, whereby the motor driving apparatus 277 equipped with the converter circuit can be reduced in size and price, leading to reductions in size and price of the washing machine 270.

Thirteenth Embodiment

Figure 13:
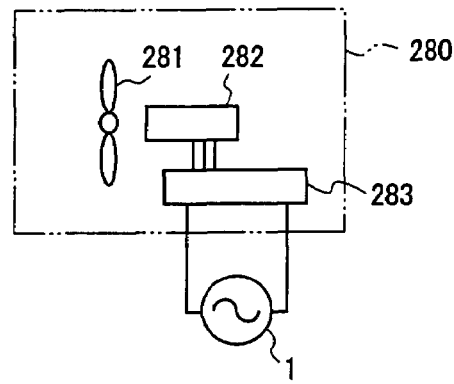
FIG. 13 is a schematic diagram for explaining an air blower according to a thirteenth embodiment of the present invention.

FIG. 13 is a block diagram for explaining an air blower according to a thirteenth embodiment of the present invention.

An air blower 280 according to the thirteenth embodiment is provided with a fan 281, a motor 282 for rotating the fan 281, and a motor driving apparatus 283 that is connected to an AC power supply 1 and drives the motor 282.

The AC power supply 1, the motor 282, and the motor driving apparatus 283 are identical to the AC power supply 1, the motor 2, and the motor driving apparatus 200 according to the fifth embodiment, respectively, and a command signal indicating a command rpm according to a user operation is input to the motor driving apparatus 283 from a microcomputer (not shown) that controls the operation of the air blower 280.

Next, the operation of the air blower 280 will be described.

In the air blower 280, when the user performs a predetermined operation, a command signal is output from the microcomputer to the motor driving apparatus 283 that receives a voltage from the AC power supply 1. Then, in the motor driving apparatus 283, the output voltage of the AC power supply 1 is rectified and boosted by the converter circuit 100a, and further, the output of the converter circuit 100a is converted into a three-phase motor driving voltage by the inverter circuit 50 (refer to FIG. 5).

When the three-phase motor driving voltage is applied to the motor 282, the motor 282 is driven and the fan 281 is rotated, whereby air blowing is carried out.

As described above, in the air blower 280 according to the thirteenth embodiment, the motor driving apparatus 283 for driving the motor 282 as a power source is provided with the converter circuit which includes the rectifier circuit for rectifying the output voltage of the AC power supply 1, and two capacitors connected in series for smoothing the output of the rectifier circuit. The motor driving apparatus 283 applies the output voltage of the AC power supply 1 to both the capacitors alternately at a cycle that is shorter than the cycle of the output voltage of the AC power supply 1. The output voltage of the converter circuit is converted into a three-phase AC voltage to be applied to the motor 282. Therefore, as in the fifth embodiment, the capacitances of the capacitors constituting the converter circuit can be reduced, whereby the motor driving apparatus 283 equipped with the converter circuit can be reduced in size and price, leading to reductions in size and price of the air blower 280.

Fourteenth Embodiment

Figure 14:
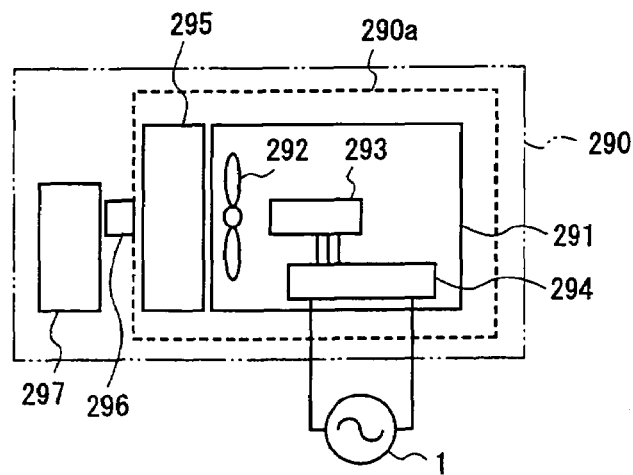
FIG. 14 is a schematic diagram for explaining an electric vacuum cleaner according to a fourteenth embodiment of the present invention.

FIG. 14 is a block diagram for explaining an electric vacuum cleaner according to a fourteenth embodiment of the present invention.

A vacuum cleaner 290 according to the fourteenth embodiment is provided with a floor suction head 297 having an inlet at its bottom, a vacuum cleaner body 290a for sucking air, and a dust suction hose having an end connected to the floor suction head 297 and the other end connected to the cleaner body 290a.

The cleaner body 290a comprises a dust collection chamber 295 having a front surface at which the other end of the dust suction hose 296 is opened, and an electric air blower 291 placed at the rear surface of the dust collecting chamber 295.

The electric air blower 291 comprises a fan 292 placed opposite to the rear surface of the dust collection chamber 295, a motor 293 for rotating the fan, and a motor driving apparatus 294 that is connected to an AC power supply 1 and drives the motor 293. The air blower 291 performs air blowing so that suction of air is carried out by rotation of the fan 292.

The AC power supply 1, the motor 293, and the motor driving apparatus 294 are identical to the AC power supply 1, the motor 2, and the motor driving apparatus 200 according to the fifth embodiment, respectively, and a command signal indicating a command rpm according to a user operation is input to the motor driving apparatus 294 from a microcomputer (not shown) that controls the operation of the air blower 290.

Next, the operation of the vacuum cleaner 290 will be described.

In the vacuum cleaner 290, when the user performs a predetermined operation, a command signal is output from the microcomputer to the motor driving apparatus 294 that receives a voltage from the AC power supply 1. Then, the output voltage of the AC power supply 1 is rectified and boosted by the converter circuit 100a, and further, the output of the converter circuit 100a is converted into a three-phase motor driving voltage by the inverter circuit 50 (refer to FIG. 5).

When the three-phase motor driving voltage is applied to the motor 293, the fan 292 is rotated by the motor 293, and a suction force is generated in the cleaner body 290a. The suction force generated in the cleaner body 290a acts on the inlet (not shown) at the bottom of the floor suction head 297 through the hose 296, and dust on the floor is sucked from the inlet of the floor suction head 297 to be collected into the dust collection chamber 295 of the cleaner body 290a.

As described above, in the vacuum cleaner 290 according to the fourteenth embodiment, the motor driving apparatus 294 for driving the motor 293 as a power source is provided with the converter circuit which includes the rectifier circuit for rectifying the output voltage of the AC power supply 1, and two capacitors connected in series for smoothing the output of the rectifier circuit. The motor driving apparatus 294 applies the output voltage of the AC power supply 1 to the both capacitors alternately at a cycle that is shorter than the cycle of the output voltage of the AC power supply 1. The output voltage of the converter circuit is converted into a three-phase AC voltage to be applied to the motor 293. Therefore, as in the fifth embodiment, the capacitances of the capacitors constituting the converter circuit can be reduced, whereby the motor driving apparatus 294 equipped with the converter circuit can be reduced in size and price, leading to reductions in size and price of the vacuum cleaner 280.

Fifteenth Embodiment

Figure 15:
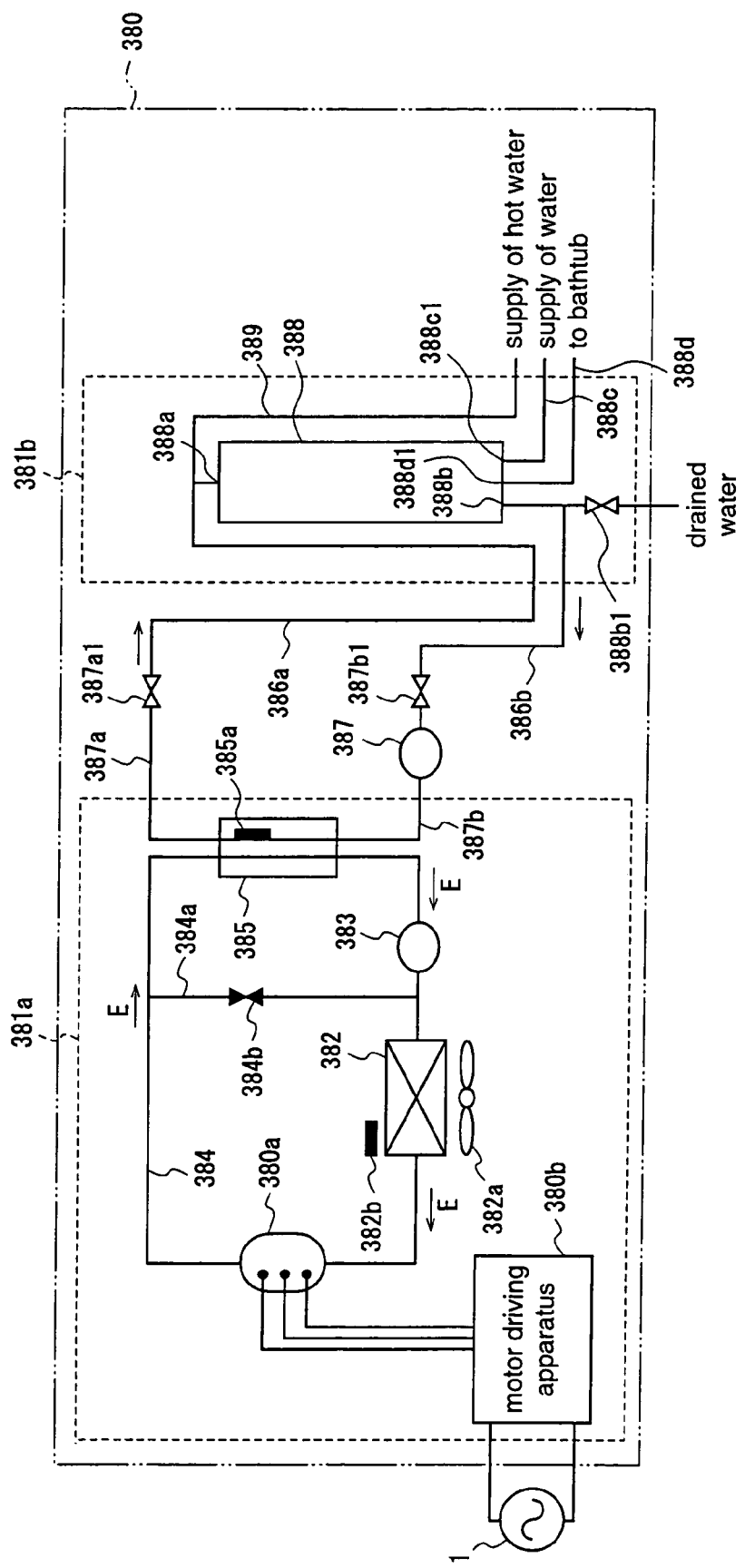
FIG. 15 is a schematic diagram for explaining a heat pump type hot-water supply unit according to a fifteenth embodiment of the present invention.

FIG. 15 is a block diagram for explaining a heat pump type hot-water supply unit according to a fifteenth embodiment of the present invention.

A heat pump type hot-water supply unit 380 according to the fifteenth embodiment includes a refrigeration cycle unit 381a for heating supplied water to discharge hot water, a hot-water storage 381b in which the hot water discharged from the refrigeration cycle unit 381a is stored, and pipes 386a, 386b, 387a, and 387b connecting the refrigeration cycle unit 381a and the hot-water storage 381b.

The refrigeration cycle unit 381a includes a compressor 380a, an air-refrigerant heat exchanger 382, a throttle 383, and a water-refrigerant heat exchanger 385, which constitute a refrigerant circulation path, and a motor driving apparatus 380b that receives a voltage from an AC power supply 1 and drives the motor of the compressor 380a.

The AC power supply 1, the motor of the compressor 380a, and the motor driving apparatus 380b are identical to the AC power supply 1, the motor 2, and the motor driving apparatus 200 according to the fifth embodiment, respectively.

The throttle 383 reduces the flow rate of the fluid refrigerant that is sent from the water-refrigerant heat exchanger 385 to the air-refrigerant heat exchanger 382 to expand the fluid refrigerant, like the throttle 253 of the air conditioner 250 of the tenth embodiment.

The water-refrigerant heat exchanger 385 is a condenser that heats up the water supplied to the refrigeration cycle unit 381a, and has a temperature sensor 385a for detecting the temperature of the heated water. The air-refrigerant heat exchanger 382 is an evaporator that absorbs heat from the ambient atmosphere. The air-refrigerant heat exchanger 382 has an air blower 382a for increasing the efficiency of heat exchange, and a temperature sensor 382b for detecting the ambient temperature.

In FIG. 15, reference numeral 384 denotes a refrigerant pipe for circulating the refrigerant along the refrigerant circulation path that is formed by the compressor 380a, the water-refrigerant heat exchanger 385, the throttle 383, and the air-refrigerant heat exchanger 382. The refrigerant pipe 284 is connected to a defrost bypass pipe 384a for supplying the refrigerant discharged from the linear compressor 380a to the air-refrigerant heat exchanger 382, bypassing the water-refrigerant heat exchanger 385 and the throttle 383, and a defrost bypass valve 384b is provided in a portion of the bypass pipe 384a.

The hot-water storage 381b has a hot-water storage tank 388 for keeping water or hot water. A water supply pipe 388c for supplying water from the outside to the storage tank 388 is connected to a water intake port 388c1 of the storage tank 388, and a hot-water supply pipe 388d for supplying hot-water from the storage tank 388 to a bathtub is connected to a hot-water discharge port 388d1 of the storage tank 388. Further, a hot-water supply pipe 389 for supplying the hot water stored in the storage tank 388 to the outside is connected to a water intake/discharge port 388a of the storage tank 388.

The storage tank 388 and the water-refrigerant heat exchanger 385 of the refrigeration cycle unit 381a are connected through pipes 386a, 386b, 387a, and 387b, and a water circulation path is formed between the storage tank 388 and the water-refrigerant heat exchanger 385.

The water supply pipe 386b is a pipe for supplying water from the storage tank 388 to the water-refrigerant heat exchanger 385. An end of the water supply pipe 386b is connected to a water discharge port 388b of the storage tank 388, while the other end of the water supply pipe 386b is connected to a water intake side pipe 387b of the water-refrigerant heat exchanger 385 through a joint 387b1. Further, a discharge valve 388b1 for discharging the water or hot water stored in the storage tank 388 is fixed to an end of the water supply pipe 386b. The water supply pipe 386a is a pipe for returning the water from the water-refrigerant heat exchanger 385 to the storage tank 388. An end of the water supply pipe 386a is connected to the water intake/discharge port 388a of the storage tank 388, while the other end of the water supply pipe 386a is connected to a discharge side pipe 387a of the water-refrigerant heat exchanger 385 through a joint 387a1.

A pump 387 for circulating the water in the water circulation path is provided in a portion of the water intake side pipe 387b of the water-refrigerant heat exchanger 385.

Further, in the hot-water supply unit 380, a command rpm of the motor is determined on the basis of the operating state of the hot-water supply unit, that is, the target temperature of hot water which is set on the supply unit, the temperature of the water that is supplied from the hot-water storage 381b to the water-refrigerant heat exchanger 385a of refrigeration cycle unit 381a, and the outdoor temperature. The motor driving apparatus 380b determines a motor output required for the motor of the compressor 380a on the basis of the command rpm.

Next, the operation of the hot-water supply unit 380 will be described.

In the hot-wafer supply unit 380, when the output voltage of the AC power supply 1 is input to the motor driving apparatus 380b, the output voltage of the AC power supply 1 is rectified and boosted by the converter circuit 100, further, the output of the converter circuit 100a is converted into a three-phase motor driving voltage by the inverter circuit 50, as in the motor driving apparatus 200 according to the fifth embodiment (refer to FIG. 5).

When the three-phase motor driving voltage is applied to the motor of the compressor 380a, the compressor 380a is driven, whereby the high-temperature refrigerant compressed by the compressor 380a circulates in the direction of arrow E, that is, the refrigerant passes through the refrigerant pipe 384 and is supplied to the water-refrigerant heat exchanger 385. Further, when the pump 387 in the water circulation path is driven, water is supplied from the storage tank 388 to the water-refrigerant heat exchanger 385.

In the water-refrigerant heat exchanger 385, heat exchange is carried out between the refrigerant and the water that is supplied from the storage tank 388, whereby heat moves from the refrigerant to the water. That is, the supplied water is heated, and the heated water is supplied to the storage tank 388. At this time, the temperature of the heated water is observed by the condensation temperature sensor 385a.

Further, in the water-refrigerant heat exchanger 385, the refrigerant is condensed by the above-mentioned heat exchange, the flow rate of the condensed fluid refrigerant is reduced by the throttle 383 to expand the refrigerant, and the refrigerant is sent to the air-refrigerant heat exchanger 382. In the hot-water supply unit 380, the air-refrigerant heat exchanger 382 serves as an evaporator. That is, the air-refrigerant heat exchanger 382 absorbs heat from the outside air that is sent by the air blower 382b to evaporate the low-temperature fluid refrigerant. At this time, the temperature of the ambient atmosphere of the air-refrigerant heat exchanger 382 is observed by the temperature sensor 382b.

Further, in the refrigeration cycle unit 381a, when the air-refrigerant heat exchanger 382 is frosted, the defrost bypass valve 384b is opened, and the high-temperature refrigerant is supplied to the air-refrigerant heat exchanger 382 through the defrost bypass line 384a. Thereby, the air-refrigerant heat exchanger 382 is defrosted.

On the other hand, the hot water is supplied from the water-refrigerant heat exchanger 385 of the refrigeration cycle unit 381a to the hot-water storage 81b through the pipes 87a and 86a, and the supplied hot water is stored in the storage tank 388. The hot water in the storage tank 388 is supplied to the outside through the hot-water supply pipe 389 as required. Especially when the hot water is supplied to a bathtub, the hot water in the storage tank 388 is supplied to the bathtub through a hot-water supply pipe 388d for the bathtub.

Further, when the amount of water or hot water stored in the storage tank 388 becomes lower than a predetermined amount, water is supplied from the outside through the water supply pipe 388c.

As described above, in the heat pump type hot-water supply unit 380 according to the fifteenth embodiment, the motor driving apparatus 380b for driving the motor as a power source of the compressor 380a is provided with the converter circuit which includes the rectifier circuit for rectifying the output voltage of the AC power supply 1, and two capacitors connected in series for smoothing the output of the rectifier circuit. The motor driving apparatus 380b applies the output voltage of the AC power supply 1 to both the capacitors alternately at a cycle that is shorter than the cycle of the output voltage of the AC power supply 1. The output voltage of the converter circuit is converted into a three-phase AC voltage to be applied to the compressor 380a. Therefore, as in the fifth embodiment, the capacitances of the capacitors constituting the converter circuit can be reduced, whereby the motor driving apparatus 380b equipped with the converter circuit can be reduced in size and price, leading to reductions in size and price of the heat pump type hot-water supply unit 380.

While in the tenth to fifteenth embodiments, the motor driving apparatus for driving the motor as a power supply is identical to the motor driving apparatus 200 according to the fifth embodiment, the motor driving apparatus may be identical to any of the motor driving apparatuses according to the sixth to ninth embodiments.

According to the present invention, a converter circuit that receives a voltage from an AC power supply is provided with a switch circuit which applies an output voltage of the AC power supply alternately to two capacitors connected in series, to an output terminal of the converter circuit, at a cycle that is shorter than a polarity inversion cycle of the output voltage. Therefore, it is possible to significantly reduce the capacitances of the capacitors which are required for generating a voltage that is twice as high as an input voltage.

What is claimed is:

1. A converter circuit having a pair of input terminals and a pair of output terminals, and for boosting an output voltage of a single phase AC power supply having a first output terminal and a second output terminal constituting a pair of output terminals of the single phase AC power supply, said converter circuit comprising:
a rectifier circuit for rectifying an output voltage between the pair of output terminals of the single phase AC power supply, and outputting the rectified output voltage of the single phase AC power supply to said pair of output terminals of said converter circuit;
first and second capacitors connected in series between said pair of output terminals of said converter circuit; and
a switch circuit comprising serially connected first and second switching elements, serially connected first and second diodes, and serially connected third and fourth diodes, wherein:
said serially connected first and second switching elements, said serially connected first and second diodes, and said serially connected third and fourth diodes are connected in parallel with each other;
a connection node of said first and second diodes is connected to the first output terminal of the single phase AC power supply;
a connection node of said third and fourth diodes is connected to the second output terminal of the single phase AC power supply;
a connection node of said first and the second switching elements is connected to a connection node of said first and the second capacitors; and
said first and the second switching elements are operable to be switched by a switching control signal having a frequency that is higher than a frequency of the single phase AC power supply.

2. A converter circuit having a pair of input terminals and a pair of output terminals, and for boosting an output voltage of a single phase AC power supply having a first output terminal and a second output terminal constituting a pair of output terminals of the single phase AC power supply, said converter circuit comprising:
a rectifier circuit for rectifying an output voltage between the pair of output terminals of the single phase AC power supply, and outputting the rectified output voltage of the single phase AC power supply to said pair of output terminals of said converter circuit;
first and second capacitors connected in series between said pair of output terminals of said converter circuit; and
a switch circuit comprising a first bidirectional switch and a second bidirectional switch, wherein:
a first end of said first bidirectional switch is connected to a first end of said second bidirectional switch;
a second end of said first bidirectional switch is connected to the first output terminal of the single phase AC power supply;

a second end of said second bidirectional switch is connected to the second output terminal of the single phase AC power supply;

a connection node of said first and second bidirectional switches is connected to a connection node of said first and the second capacitors; and said first and second bidirectional switches are operable to be switched by a switching control signal having a frequency that is higher than a frequency of the single phase AC power supply.

3. A converter circuit having a pair of input terminals and a pair of output terminals, and for boosting an output voltage of an single phase AC power supply having a first output terminal and a second output terminal constituting a pair of output terminals of the single phase AC power supply, said converter circuit comprising:

a rectifier circuit for rectifying an output voltage between the pair of output terminals of the single phase AC power supply, and outputting the rectified output voltage of the single phase AC power supply to said pair of output terminals of said converter circuit;

a first capacitor connected between said pair of output terminals of said converter circuit;

a second capacitor having a first end and a second end, said first end of said second capacitor being connected to one of said pair of output terminals of said converter circuit; and a switch circuit comprising:

serially connected first and second switching elements;

serially connected first and second diodes; and serially connected third and fourth diodes, wherein:

said serially connected first and second switching elements, said serially connected first and second diodes, and said serially connected third and fourth diodes are connected in parallel with each other;

a connection node of said first and second diodes is connected to the first output terminal of the single phase AC power supply;

a connection node of said third and fourth diodes is connected to the second output terminal of the single phase AC power supply;

a connection node of said first and second switching elements is connected to said second end of said second capacitor; and said first and second switching elements are operable to be switched by a switching control signal having a frequency that is higher than a frequency of the single phase AC power supply.

4. A converter circuit having a pair of input terminals and a pair of output terminals, and for boosting an output voltage of a single phase AC power supply having a first output terminal and a second output terminal constituting a pair of output terminals of the single phase AC power supply, said converter circuit comprising:

a rectifier circuit for rectifying an output voltage between the pair of output terminals of the single phase AC power supply, and outputting the rectified output voltage of the single phase AC power supply to said pair of output terminals of said converter circuit;

a first capacitor connected to said pair of output terminals of said converter circuit;

a second capacitor having a first end and a second end, said first end of said second capacitor being connected to one of said pair of output terminals of said converter circuit; and a switch circuit comprising a first bidirectional switch and a second bidirectional switch, wherein:

a first end of said first bidirectional switch is connected to a first end of said second bidirectional switch;

a second end of said first bidirectional switch is connected to the first output terminal of the single phase AC power supply;

a second end of said second bidirectional switch is connected to the second output terminal of the single phase AC power supply;

a connection node of said first and second bidirectional switches is connected to said second end of said second capacitor; and said first and second bidirectional switches are operable to be switched by a switching control signal having a frequency that is higher than a frequency of the single phase AC power supply.

* * * * *